US008645337B2

(12) United States Patent
Kapoor et al.

(10) Patent No.: US 8,645,337 B2
(45) Date of Patent: Feb. 4, 2014

(54) STORING COMPRESSION UNITS IN RELATIONAL TABLES

(75) Inventors: Vikram Kapoor, Cupertino, CA (US); Amit Ganesh, San Jose, CA (US); Jesse Kamp, San Leandro, CA (US); Sachin Kulkarni, Foster City, CA (US); Vineet Marwah, San Ramon, CA (US); Kam Shergill, Berkshire (GB); Roger Macnicol, Hummelstown, PA (US); Manosiz Bhattacharyya, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 12/769,205

(22) Filed: Apr. 28, 2010

(65) Prior Publication Data

US 2010/0281004 A1    Nov. 4, 2010

Related U.S. Application Data

(63) Continuation-in-part of application No. 12/617,669, filed on Nov. 12, 2009.

(60) Provisional application No. 61/174,447, filed on Apr. 30, 2009.

(51) Int. Cl.
*G06F 7/00* (2006.01)
*G06F 17/00* (2006.01)
*G06F 17/30* (2006.01)

(52) U.S. Cl.
USPC .......................................... 707/693; 707/752

(58) Field of Classification Search
USPC .......................................... 707/690–695, 752
See application file for complete search history.

(56) References Cited

U.S. PATENT DOCUMENTS

| 5,263,145 A | 11/1993 | Brady et al. |
| 5,404,510 A | 4/1995 | Smith et al. |
| 5,506,979 A | 4/1996 | Menon |
| 5,546,575 A | 8/1996 | Potter et al. |
| 5,699,457 A | 12/1997 | Adar et al. |

(Continued)

OTHER PUBLICATIONS

U.S. Appl. No. 11/875,642, filed Oct. 19, 2007 (27 pages).

(Continued)

*Primary Examiner* — Usmaan Saeed
*Assistant Examiner* — Navneet K Ahluwalia
(74) *Attorney, Agent, or Firm* — Hickman Palermo Truong Becker Bingham Wong LLP; Karl T. Rees

(57) ABSTRACT

A database server stores compressed units in data blocks of a database. A table (or data from a plurality of rows thereof) is first compressed into a "compression unit" using any of a wide variety of compression techniques. The compression unit is then stored in one or more data block rows across one or more data blocks. As a result, a single data block row may comprise compressed data for a plurality of table rows, as encoded within the compression unit. Storage of compression units in data blocks maintains compatibility with existing data block-based databases, thus allowing the use of compression units in preexisting databases without modification to the underlying format of the database. The compression units may, for example, co-exist with uncompressed tables. Various techniques allow a database server to optimize access to data in the compression unit, so that the compression is virtually transparent to the user.

54 Claims, 10 Drawing Sheets

(56) References Cited

U.S. PATENT DOCUMENTS

| | | | |
|---|---|---|---|
| 5,794,229 A | 8/1998 | French et al. | |
| 5,867,723 A | 2/1999 | Chin et al. | |
| 5,995,080 A | 11/1999 | Biro et al. | |
| 6,061,763 A | 5/2000 | Rubin et al. | |
| 6,643,633 B2 | 11/2003 | Chau et al. | |
| 7,076,108 B2 | 7/2006 | Huang et al. | |
| 7,079,056 B2 | 7/2006 | Weaver | |
| 7,225,249 B1 | 5/2007 | Barry et al. | |
| 7,469,266 B2 | 12/2008 | Gustavson et al. | |
| 7,496,589 B1 | 2/2009 | Jain et al. | |
| 7,552,218 B2 | 6/2009 | Kaluskar et al. | |
| 7,565,346 B2 | 7/2009 | Fan et al. | |
| 7,693,325 B2 | 4/2010 | Pulla et al. | |
| 7,707,194 B2 | 4/2010 | Bresch et al. | |
| 7,882,122 B2 | 2/2011 | Wong | |
| 8,073,777 B2 | 12/2011 | Barry et al. | |
| 8,099,440 B2 | 1/2012 | Johnson et al. | |
| 8,296,517 B2 | 10/2012 | Potapov et al. | |
| 2003/0108248 A1 | 6/2003 | Huang et al. | |
| 2003/0212694 A1* | 11/2003 | Potapov et al. | 707/100 |
| 2004/0139099 A1 | 7/2004 | Weaver | |
| 2005/0027729 A1 | 2/2005 | Kuchinsky et al. | |
| 2005/0210054 A1 | 9/2005 | Harris | |
| 2005/0216421 A1 | 9/2005 | Barry et al. | |
| 2005/0278324 A1 | 12/2005 | Fan et al. | |
| 2006/0100912 A1 | 5/2006 | Kumar et al. | |
| 2007/0109155 A1 | 5/2007 | Fallon | |
| 2007/0143248 A1 | 6/2007 | Uppala | |
| 2008/0010240 A1 | 1/2008 | Zait | |
| 2008/0050025 A1 | 2/2008 | Bashyam et al. | |
| 2008/0071818 A1 | 3/2008 | Apanowicz et al. | |
| 2008/0098048 A1 | 4/2008 | Cao et al. | |
| 2008/0162523 A1 | 7/2008 | Kraus et al. | |
| 2008/0294676 A1 | 11/2008 | Faerber et al. | |
| 2008/0294863 A1* | 11/2008 | Faerber et al. | 711/170 |
| 2009/0006399 A1 | 1/2009 | Raman et al. | |
| 2009/0234823 A1 | 9/2009 | Wong | |
| 2009/0319536 A1 | 12/2009 | Parker et al. | |
| 2010/0030796 A1 | 2/2010 | Netz et al. | |
| 2010/0042587 A1 | 2/2010 | Johnson et al. | |
| 2010/0278446 A1 | 11/2010 | Ganesh et al. | |
| 2010/0281079 A1 | 11/2010 | Marwah et al. | |
| 2011/0029569 A1 | 2/2011 | Ganesh et al. | |
| 2011/0047330 A1 | 2/2011 | Potapov et al. | |
| 2011/0295817 A1 | 12/2011 | Chandrasekar et al. | |
| 2012/0054225 A1 | 3/2012 | Marwah et al. | |
| 2013/0036101 A1 | 2/2013 | Marwah | |

OTHER PUBLICATIONS

Loshin, D., "Gaining the Performance Edge Using a Column-Oriented Database Management System" (2009) 12 pages.

"C-Store: A Column-Oriented DBMS" downloaded from the Internet Apr. 1, 2010 < http://db.csail.mit.edu/projects/cstore/#papers > 4 pages.

Stonebraker, M. et al., "C-Store: A Column-oriented DBMS", Proceedings of the 31$^{st}$ VLDB Conference, Trondheim, Norway 2005 (12 pages).

Abadi, D. et al., "Integrating Compression and Execution in Column-Oriented Database Systems" Sigmod 2006 (12 pages).

Oracle Corporation, "Oracle Advanced Compression: A White Paper" dated Apr. 2008, 13 pages.

Rabb, David, "How to Judge a Columnar Database", Information Management, website http://license.icopyright.net/user/viewFreeUse.act?fuid=MTMxMDAzMjU%3D, dated Dec. 14, 2007, 2 pages.

MacNicol Roger et al, "Sybase IQ Multiplex-Designed for Analytics", Proceedings of the 30$^{th}$ VLDB Conference, dated 2004, 4 pages.

Sybase IQ, "Administration Guide", Document ID: 35375-01-1121-02, dated Sep. 19, 1997, 426 pages.

Sybase IQ, "Gaining the Performance Edge Using a Column-Oriented Database Management System", 12 pages, dated Mar. 2009.

Sybase IQ, "An Advanced Columnar Data Warehouse Architecture", Winter Corporation, 17 pages, Dated Jun. 2010.

Winter Corporation, "Demonstrating Efficiency in Large-Scale Data Warehousing", A review of new TPC-H results for the Sun-Sybase IQ Platform, 20 pages, dated in 2003.

U.S. Appl. No. 12/617,669, filed Nov. 12, 2009, Office Action, Sep. 19, 2013.

* cited by examiner

STORING COMPRESSION UNITS IN RELATIONAL TABLES

CROSS-REFERENCE TO RELATED APPLICATIONS; BENEFIT CLAIM

This application claims benefit of Provisional Application 61/174,447, entitled "Superblocks," filed Apr. 30, 2009 by Ganesh et al., the entire contents of which is hereby incorporated by reference as if fully set forth herein, under 35 U.S.C. §119(e). This application claims benefit under 35 U.S.C. §120 as a Continuation-in-part of application Ser. No. 12/617,669, entitled "Structure Of Hierarchical Compressed Data Structure For Tabular Data," filed Nov. 12, 2009 by Ganesh et al., the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

This application is also related to U.S. patent application Ser. No. 12/769,508, entitled "Compression Analyzer," filed on same day herewith, the entire contents of which are hereby incorporated by reference as if fully set forth herein.

FIELD OF THE INVENTION

The present invention relates to database storage and, more specifically, to storing database data as compression units within data blocks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Databases and Database Servers

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database metadata defines database objects, such as tables, object tables, views, or complex types, such as object types, and, importantly table functions. SQL data definition language ("DDL") instructions are issued to a database server to create or configure database objects.

Generally, data is logically arranged within a database as one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Data Blocks

While databases are arranged logically in data containers, those containers are themselves typically stored in one or more data blocks on, for example, a hard disk. So, for example, while most users will issue instructions or queries to the database server that refer to data via reference to tables, rows, and columns, that data is actually stored in a database as a collection of data blocks. Through the use of various stored metadata, indexes, and headers, the database server is able to interpret the data within these data blocks as logical tables, rows, and columns.

A data block is an atomic unit of storage space allocated to store raw data for one or more database records (e.g., rows), or portions thereof. Typically, a database system is configured to read and write database records from persistent storage and volatile memory in units no smaller than data blocks. When a record from a data block needs to be retrieved, the entire data block is read into an in-memory buffer the database system uses to temporarily store data blocks. In many databases, data blocks are all of a common size. Database administrators select this size based on a number of considerations. However, tables often comprise more data than can fit in a single data block. Thus, tables often span many data blocks.

For example, FIG. 1 illustrates how a table 100 may be stored in example data blocks 120 and 130. Because data blocks 120 and 130 are both of a predefined size that is smaller than table 100, it is impossible to fit table 100 in a single data block. Thus table 100 is stored in two data blocks.

Data blocks are typically subdivided into one or more contiguous segments herein described as "data block rows." When interpreted by the database server, each data block row yields data from at least a portion of a table. As implied by the name "data block row," a single data block row holds raw data corresponding to a single row of a table. However, there is not always a one-to-one correspondence between table rows and data block rows.

For example, table 100 is comprised of rows 101-105, organized into columns 111-115. The data for table rows 101-105 is stored in data block rows 121-124 and 131-132. Specifically, each data block row 121-124 and 131-132 comprises multiple fields 190. Each field 190 corresponds to a single column value from table 100. While data block rows 121,122,123, and 132 have a one-to-one correspondence with table rows 101,102,103, and 105 respectively, the data for table row 104 is divided amongst data block rows 124 and 131. When data for a table row is divided amongst multiple data block rows in different data blocks, the table row is said to chained across the multiple data blocks, and the data block rows may be referred to collectively as a chain.

Although "rows" in a table and "rows" in a data block are both commonly known as "rows," it should by now be apparent that the two types of "rows" are distinct concepts. To avoid confusion, this application shall therefore, where necessary, use the terms "table row" and "data block row," respectively, to refer to "rows" of a data block and "rows" of a table.

In some databases, each data block row is delimited by a row header. Each row header may contain a variety of metadata, including an identifier for the data block row, the number of columns that the database server should expect to read from the data block row, and/or the sizes of each column in the data block row (thereby instructing the database server as to the boundaries of each field in the data block row). For example, each of data block rows 121-124 and 131-132 include a data block row header 121a-124a or 131a-132a. In some embodiments, the size (or length) of each column is instead inserted as a separate field of predefined length that immediately precedes each column field in the data block row.

In some databases, when data for a table row is chained over multiple data block rows (because of, for instance, size or column count limitations), the database may also store metadata associating one or more of the data block rows with one or more other data block rows in which data for the same table row is held. This metadata may be in any location, such as in the row header, data block header, or at the end of the data block row. For instance, pointer 129 in data block row 124 points to data block row 131, which comprises the remaining data values of table row 104.

Data blocks may also have headers and/or other data structures that describe information about the data block and/or the tables whose raw data they hold. For instance, data blocks 120 and 130 comprise header data 125 and 135, respectively. A data block header may, for instance, include metadata such as a table directory that describes various qualities of the tables and table rows for which its data block comprises data. A data block header may also, for instance, include metadata such as a row directory indicating the starting address of and/or an identifier for each data block row in the data block.

The metadata in a data block's header (or in an equivalent structure) may, in some databases, define and delimit the data block rows for the data block. Thus, in some databases, a data block row may be characterized as the lowest level subdivision of a data block whose address is discernable from the data block's header, or as any subdivision of the data block for which the data block header lists an indexable identifier.

Data blocks 120 and 130 are organized in a format known as "row major," and may therefore be described as "row major data blocks." The format is known as "row major" because each data block row 121-124 and 131-132 contains data from only a single row of the table. Other databases may instead store tables within data blocks using other formats, including formats such as "column major." The techniques described herein are applicable to any type of data block, regardless of the format used.

Note that table 100 and data blocks 120-130 are each relatively small in size. This application equally contemplates the use much larger tables and much larger data blocks. However, for the purposes of clarity, the example tables and data blocks herein are relatively simple.

An example implementation of a database with data blocks is described in "Oracle 9i: Database Concepts, Release 2 (9.2)," published by Oracle Corporation in March 2002, and available at the time of writing at http://download.oracle.com/docs/cd/B10501_01/server.920/a96524.pdf, the entire contents of which is hereby incorporated by reference as if fully set forth herein.

Addressing Data from Data Blocks

A database may store a variety of metadata to assist a database server in interpreting the data stored within the database's data blocks. For example, various indexes may comprise mapping data associating each table in the database with one or more data blocks. As another example, various indexes may comprise mapping data that associates table rows with data row blocks.

For example, index 150 of FIG. 1 comprises a list 151 of table rows in table 100, along with addresses 152 of data block rows that contain data for the table rows. Addresses 152—which may also be described as rowids—are each comprised of two elements: a data block identifier, consisting of numbers before the period, and a data block row identifier, consisting of numbers after the period. However, other addressing schemes may also be used.

A database server may utilize such metadata to locate data blocks and/or data block rows that store data for tables and table rows. For example, the database server may require access to data from table row 101 of FIG. 1. Using index 150, the database server may determine that data for table row 101 is in the first data block row of data block 120 (i.e. data block row 121). The database server may then utilize a data block identifier-to-address mapping or algorithm to locate data block 120 on disk. The database server may then utilize other mapping data (such as data in the data block header mapping the data block row identifier to a block-relative address) to locate the start of the first data block row in data block 120. The database server may then read and interpret this row, thereby producing the data for table row 101.

For table rows whose data spans multiple data block rows, row indexes such as index 150 may point only to the data block row that comprises data for the first portion of the table row. Upon determining that the table row is not fully represented by the values in the data block row, the database server may utilize metadata such as pointer 129 to ascertain the location of other data block rows that comprise additional data for the table row. For example, in locating data for table row 104, a database server may be first directed to data block row 124. The database server may then follow pointer 129 to data block row 131, which comprises the remaining data for table row 104.

Compressed Data Blocks

In some databases, the raw data within each data block may be compressed at the block level. For example, if the word "San Jose" appears multiple times within a data block, the data block may substitute each occurrence of "San Jose" with a symbol or smaller set of characters, such as "@1," and then store a decompression dictionary (also known as a symbol table) that associates "@1" with "San Jose." As the database server interprets a data block row that contains such compressed values, the database server may utilize the decompression dictionary to interpret compressed values. In some databases, the decompression dictionary is localized for each block and then stored inside of the block itself (for example, in the data block header). In other databases, the decompression dictionary is shared amongst multiple data blocks, and thus stored in its own block, separate from the multiple data blocks. Such compression schemes shall hereinafter be referred to as "block-based compression."

An example implementation of block-based compression is described in "Oracle Advanced Compression: A White Paper," published by Oracle Corporation in April 2008, and available at the time of writing at http://www.oracle.com/technology/products/database/oracle11g/pdf/advanced-compression-whitepaper.pdf, the entire contents of which is hereby incorporated by reference as if fully set forth herein.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
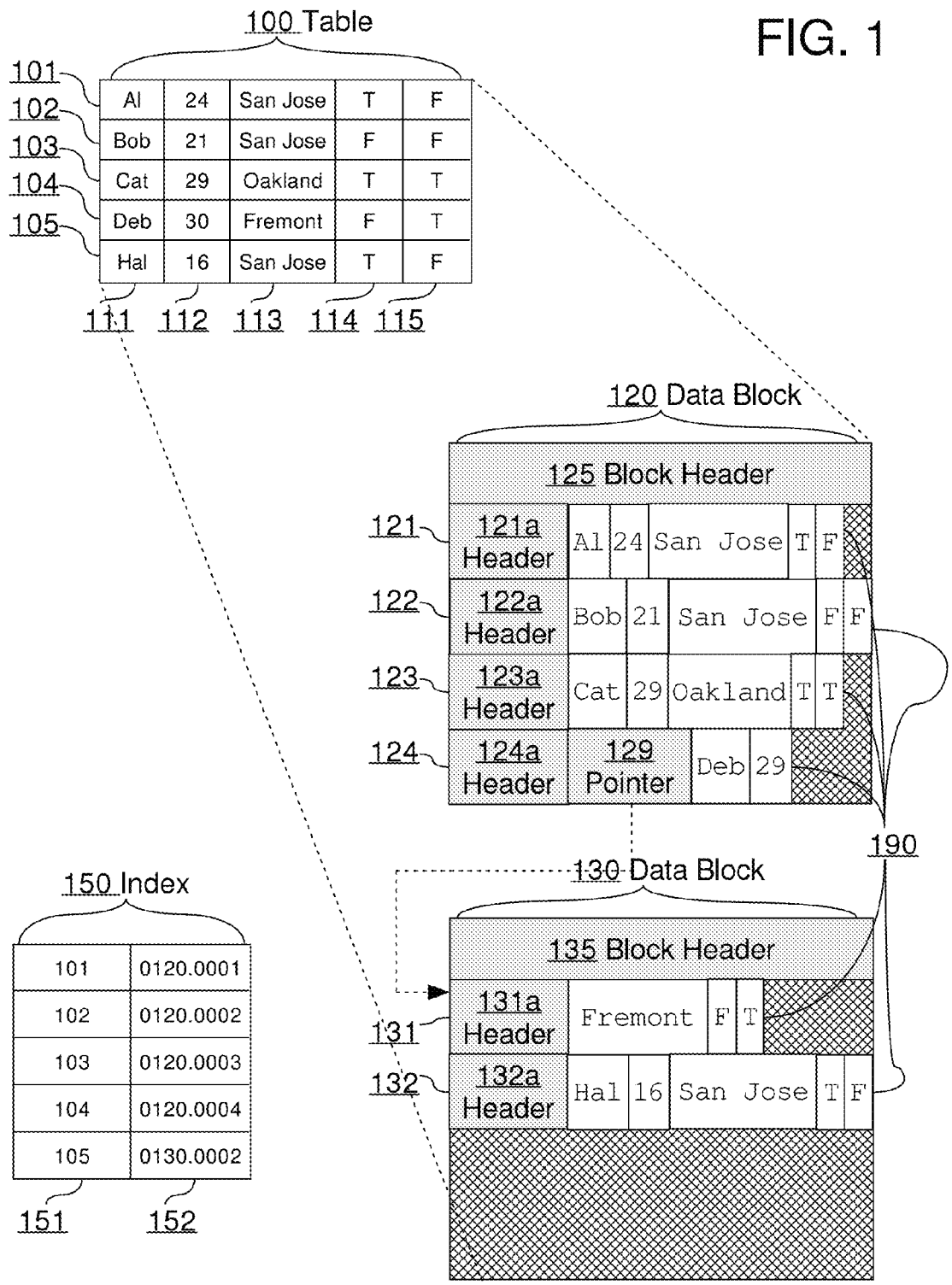
FIG. 1 illustrates how an uncompressed table may be stored in example data blocks.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. General Overview

Approaches and techniques are described for storing compression units in data blocks of a database. A table, or data from a plurality of rows thereof, is compressed into a "compression unit" using any of a wide variety of compression techniques. The compression unit is then stored in one or more data block rows across one or more data blocks. As a result, a single data block row may comprise compressed data for a plurality of table rows, as encoded within the compression unit.

Storage of compression units in data blocks maintains compatibility with existing data block-based databases, thus allowing the use of compression units in preexisting databases without modification to the underlying format of the database. The compression units may thus co-exist with uncompressed data blocks and data block rows.

According to an embodiment, the manner of storage is such that, except for added resource consumption for decompression, the compression is transparent to the user. For example, the database server may provide access to rows within compression units via a query or an index, even though the database server may be required to decompress portions of the compression unit to discover what data is contained within the rows, or even the exact location of the rows.

According to an embodiment, when the database server receives a request that requires the database server to access one or more table rows that have been stored in a compression unit, the database server locates the one or more data blocks in which the compression unit is stored. The database server decompresses the compression unit (or a portion thereof) and places the resulting decompressed matrix in a temporary buffer. The database server may then locate the desired data in the decompressed matrix.

According to an embodiment, each table row in a compression unit is addressed within the database with reference to the row number of the table row in the compression unit, as opposed to a data block row number. When the database server is directed to a data block row that includes a compression unit, the database server thus takes additional steps to ascertain the exact location of the desired table row. For example, the database server may decompress the compression unit (or a portion thereof) and utilize mapping data within or associated with the compression unit to determine the location of the desired table row in the decompressed compression unit.

According to an embodiment, to avoid confusion in databases where compression units coexist with uncompressed data (or data that has been compressed at the data block level), the database stores metadata, such as a flag in the data block header or row header, indicating that a data block row comprises a compression unit. When metadata for a data block indicates that a data block row comprises a compression unit, the database server processes the data block row using the compression unit techniques described herein. If the metadata does not indicate that the data block row comprises a compression unit, the database server interprets the data block row using conventional techniques.

According to an embodiment, a single compression unit may span multiple data blocks. For example, a first data block row in a first data block may contain a first portion of the compression unit, a second data block row in a second data block may contain a second portion of the compression unit, and so forth.

According to an embodiment, each compression unit is associated with metadata that indicates addresses at which some or all of table rows and/or table columns in the compression unit are stored. Based on this information, the database server may determine that certain data (e.g. a desired column or row) is contained entirely within a first portion of the compression unit stored within a first data block. To access this certain data, the database server need only retrieve the first data block and decompress the first portion. The database server need not, for instance, retrieve a second data block and decompress a second portion of the compression unit stored within the second data block. Thus, the database server performs selective decompression of compression unit portions. The database server selectively fetches and decompresses only those data blocks in which required compression unit portions are stored. For instance, if the required table rows and/or columns are stored only in portions mapped to the first and third data blocks in a chain, the database server need fetch only the first and third data blocks and decompress the compression unit portions stored therein. The database server needs neither to fetch nor decompress any data from the second data block.

According to an embodiment, each compression unit may be associated with metadata that identifies, for each of certain rows and/or columns in the table, an address of a location relative to the compression unit at which the certain row and/or column is stored. Each compression unit may further be associated with metadata that identifies the starting address (relative to the compression unit) of each portion of the compression unit, along with the data block at which each portion of the compression unit is stored. Such metadata may be stored in, for example, a header inside of the compression unit, a compression unit row header inside of the data block row, the data block row header, the data block header, a separate index, and/or any other suitable location.

In other aspects, the invention encompasses a computer apparatus and a computer-readable medium configured to carry out the foregoing steps.

2.0. Structural Overview 2.1. Compression Units

According to an embodiment, data from certain table rows (or an entire table) in a database may be compressed into compression units. For example, table 100 of FIG. 1 may be compressed entirely into a single compression unit using any of a variety of techniques. Example techniques for compressing tabular data into a compression unit are discussed, for instance, in U.S. patent application Ser. No. 12/617,669 by Ganesh et al., entitled "STRUCTURE OF HIERARCHICAL COMPRESSED DATA STRUCTURE FOR TABULAR DATA" and filed Nov. 12, 2009, and in U.S. patent application Ser. No. 12/769,508 by Kapoor, et al., entitled "COMPRESSION ANALYZER" and filed Apr. 28, 2010, the entire contents of both of which are hereby incorporated by reference as if fully set forth herein. However, embodiments of the invention are not limited to the techniques described in "STRUCTURE OF HIERARCHICAL COMPRESSED DATA STRUCTURE FOR TABULAR DATA" or "COMPRESSION ANALYZER." For example, table 100 may be compressed into a compression unit by simply encoding the table in accordance with a common archiving format such as ZIP or RAR.

According to an embodiment, a compression unit need not necessarily include an entire table or index. For example, a table may be divided into any number of portions based on selected columns and/or rows. The following divisions of table 100 are just several of the many ways table 100 could be divided: (1) a first portion for columns 111-113 and a second portion for columns 114-115; (2) a first portion for rows 101-102, a second portion for rows 103-104, and a third portion for row 105; (3) a first portion for columns 111-112 of rows 101-102; a second portion for columns 111-112 of rows 103-105; and a third portion for columns 113-115 of all rows. Once a table has been divided into portions, each portion may then be compressed into a separate compression unit. Or, in some cases, certain portions may remain uncompressed.

For convenience, this application may refer to certain compression units as compressed data for certain tables. By such language, this application does not limit its techniques to compression units comprising an entire table; rather a compression unit may simply comprise data from at least a portion of the table Likewise, this application may, for convenience, describe certain compression units as comprising compressed data for one or more table rows or one or more of table columns. By such language, this application does not require that the compression units include each and every value in each of the one or more table rows or in each of the one or more table columns. Rather, a compression unit that includes compressed data for one or more table rows or one or more of table columns may simply include compressed data from at least a portion of each table row or table column in the one or more table rows or the one or more table columns.

A table may be divided into portions for the purposes of generating compression units based on any of a number of considerations. For example, it may be desirable to break up very large tables into multiple compression units. Or, it may be desirable to compress only certain columns of the table in a compression unit. Example considerations for determining how to divide a table into portions are discussed in, for example, "COMPRESSION ANALYZER."

Compression for compression units occurs outside of the data block context, and instead at a table-wide or portion-wide level. So, for example, instead of compressing data values in a data block individually as they are inserted in the data block, or instead of compressing data values after they have been stored in a data block, a database server compresses the entire table or a multi-value portion thereof outside of the data block context. The database server then stores the compression unit (as opposed to individual compressed values) in the data block, according to the various techniques such as those described herein.

In some embodiments, each compression unit is "self-contained," meaning that decompression metadata (such as a dictionary or other information helpful in choosing and implementing a decompression algorithm) is stored within the compression unit as opposed to within data block headers or within other data blocks. This means, for instance, that in a data block with multiple compression units, each compression unit may have its own unique decompression data. In other embodiments, decompression metadata may instead be stored separate from the compression unit, but the decompression metadata nonetheless applies to the compression unit as a whole and not at the data block level.

In compression units that span multiple portions, the decompression metadata may only be found in a single portion of the compression unit (e.g. the header), and thus not be present in some or most of the data blocks in which compression unit portions reside. Thus, to decompress a portion of the compression unit that has been stored in a data block other than the data block that includes the portion with the decompression metadata, the portion with the decompression metadata must be read. However, in some embodiments it may not be necessary to read or decompress portions other than these two portions.

As mentioned above, compression for compression units occurs outside of the data block context, and instead at a table-wide or portion-wide level. Compression of a whole table (or selected portions thereof) as a single compression unit outside of the data block context provides numerous benefits over block-based compression. For example, data blocks that have been compressed using block-based compression must still conform to the data block format, just like any other data block. Thus, while block-based compression can utilize compression algorithms that replace column values with symbols, block-based compression cannot, for example, employ any compression algorithm that would alter the fundamental structure of the data block. Moreover, many other compression algorithms do not lend themselves to the data block format.

Another example of an advantage of compression units over many block-based compression implementations—especially implementations with dictionaries that are local to each block—is that compression units are able to compress larger amounts of data in one unit, therefore increasing the likelihood that a given data item can be compressed. For example, consider a table for which a certain column always contains one of a handful of values. Compression of those values may not be possible at the data block level if the table spans a large number of data blocks (for instance, if each data block comprises only a few rows of the table).

Another example of an advantage of compression units over many block-based compression implementations is the flexibility that compression units offer in optimizing a decompression dictionary. Data in a compression unit may be carefully selected and arranged so as to minimize the size of the decompression dictionary—and in fact, different subunits of the compression unit may each have a different and more finely tailored data dictionary. Meanwhile, a block-based decompression dictionary must include translation data for an entire block, even if data in some parts of the block bears little resemblance to data in other parts of the block.

For further examples of advantages that result from divorcing compression techniques from the data block itself, see for instance the compression units described in "STRUCTURE OF HIERARCHICAL COMPRESSED DATA STRUCTURE FOR TABULAR DATA" and "COMPRESSION ANALYZER."

2.2. Storing a Compression Unit in a Single Data Block

Figure 2:
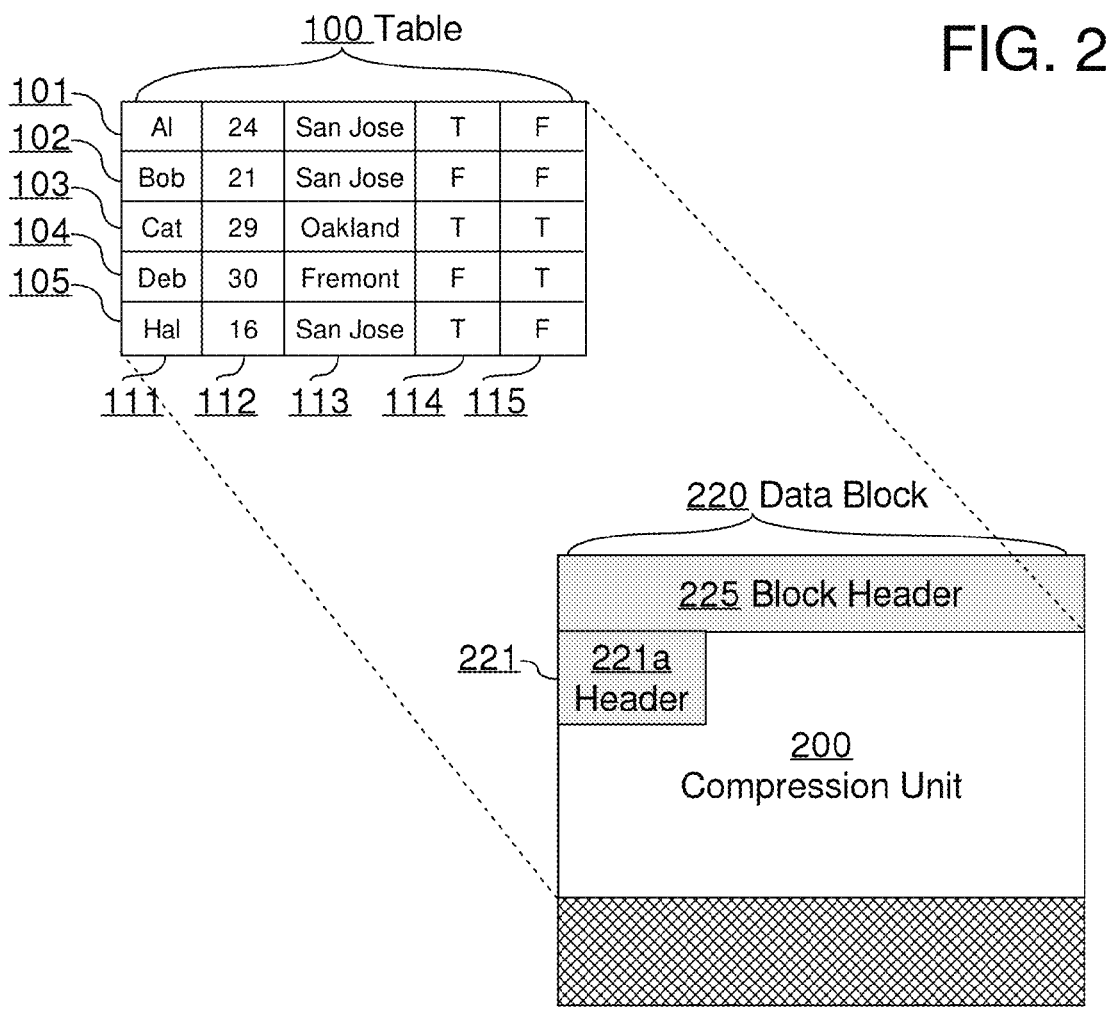
FIG. 2 illustrates a data block in which is stored a complete compression unit.

FIG. 2 illustrates a data block 220 in which is stored a complete compression unit 200, according to an embodiment. As depicted, compression unit 200 is a compressed version of the entire table 100. However, compression unit 200 may be a compressed version of any table or portion thereof. Data block 220 is of the same size as data blocks 120 and 130 of FIG. 1. However, on account of the data for table 100 being compressed inside of compression unit 200, the data for table 100 is able to fit inside of a single data block 220 as opposed to multiple data blocks as in FIG. 1.

Like data blocks 120 and 130, data block 220 comprises a data block row 221. Data block row 221 includes a data block row header 221a, just like the data block rows of data blocks 120 and 130. However, unlike the data block rows of data blocks 120 and 130, data block row 221 stores compression unit 200 instead of a plurality of fields with individual column values from a table row of table 100. Thus, while each data block row of data blocks 120 and 130 stores data from only a single row of table 100, data block row 221 stores the compressed data for a plurality of table rows—in this case, for table 100 in its entirety.

In an embodiment, compression unit 200 is stored as if it were a column field of the data block row. The data block row therefore includes data indicating the length of the compression unit 200 in, for example, a length field immediately preceding compression unit 200.

Also like data blocks 120 and 130, data block 220 comprises a data block header 225 in which is stored various metadata to assist a database server in interpreting the data in data block 220.

2.3. Chaining a Compression Unit Over Multiple Data Blocks

Depending on the size of a compression unit and the size of the data blocks available to store the compression unit, it may be necessary to divide a compression unit into separate portions that may be stored over multiple data blocks. This division of the compression unit into one or more compression unit portions occurs subsequent to generating the compression unit, and is therefore conceptually separate from the previously discussed division of a table into one or more table portions (although data block size may nonetheless be a consideration in determining how divide a table into portions for compression).

A variety of techniques may be used to divide a compression unit into portions. The compression unit may be divided, for example, so that all portions of the compression unit (or all but the last portion) are of a desired size, the desired size being less than or equal to the size of data blocks in the database. As another example, the compression unit may be divided based on characteristics of the compressed data inside of the compression unit—so that, for example, the compressed data for certain columns or rows is contained entirely within a portion or group of portions.

Figure 3:
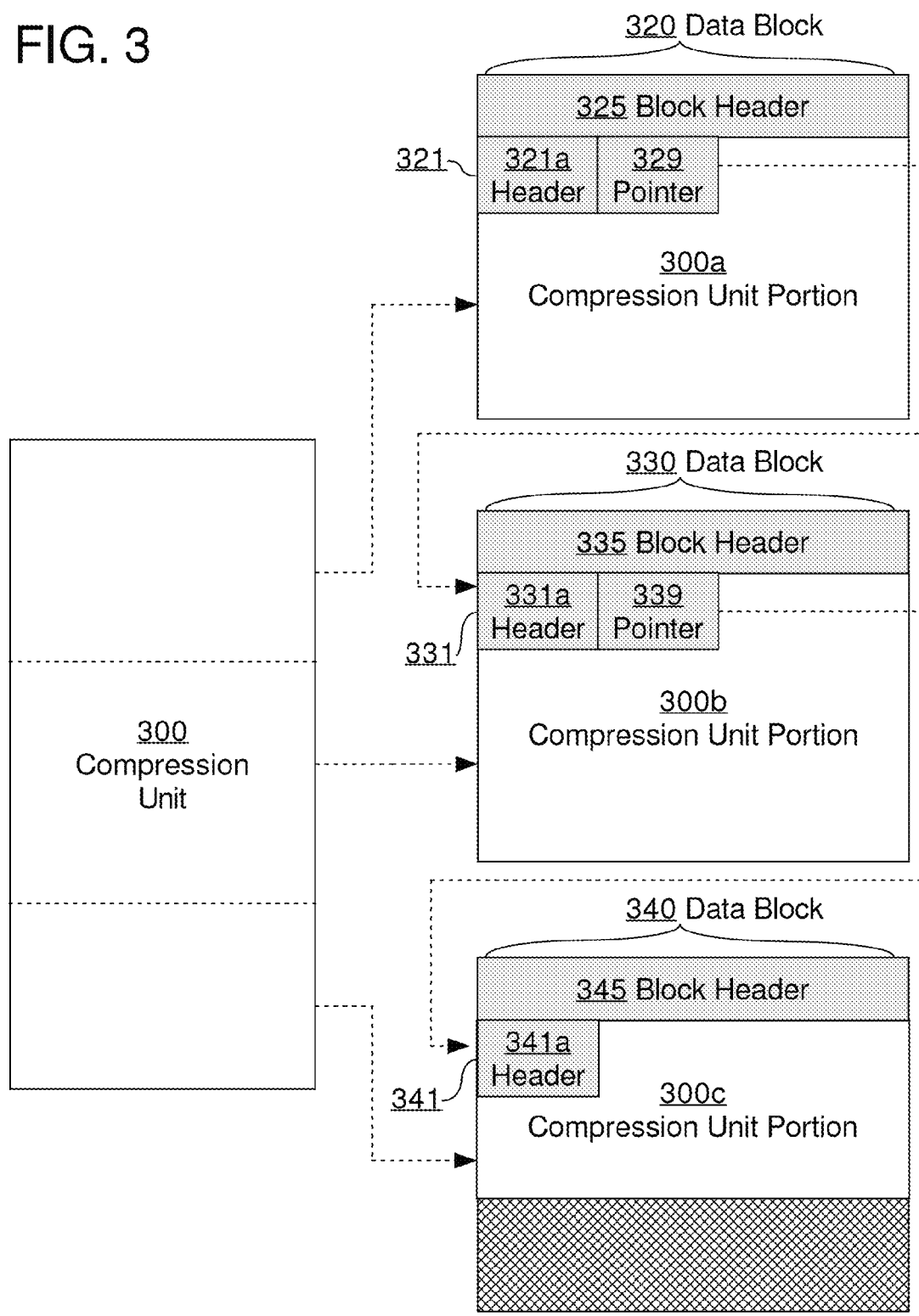
FIG. 3 illustrates a compression unit stored over several data blocks instead of in a single data block.

For example, FIG. 3 illustrates a compression unit 300 stored over several data blocks instead of in a single data block, according to an embodiment of the invention. Specifically, compression unit 300 is divided into three portions 300a, 300b, and 300c, each stored in a separate data block 320, 330, or 340. Portion 300a is stored in data block row 321 of data block 320. Portion 300b is stored in data block row 331 of data block 330. Portion 300c is stored in data block row 341 of data block 340.

As with uncompressed table rows that span multiple data block rows, compression unit 300 may be described as being chained across multiple data blocks. Data block rows 321, 331, and 341 and compression unit portions 300a, 300b, and 300c may both be described as chains.

Data block rows 321, 331, and 341 each comprise a data block row header 321a, 331a, and 341a, respectively. Data block rows 321 and 331 each further comprise a pointer 329 and 339 respectively. Like pointer 129 of FIG. 1, pointers 329 and 339 point to other data block rows in the chain. In this case, pointer 329 points to data block row 331 and pointer 339 points to data block row 341. Pointers 329 and 339 instruct a database server that the data in data block rows 321 and 331 is only a portion of the compression unit, and further instruct the database server as to where it should go to find the next portion in the chain.

For example, the database server may read data block row 321 to retrieve portion 300a. While reading data block row 321, the database server would encounter pointer 329. Upon encountering pointer 329, the database server would then read data block row 331 and find compression unit portion 300b. Portion 300b would be appended to 300a. However, the database server would further encounter pointer 339 in data block row 331. Thus, the database server would then read data block row 341 to obtain portion 300c. Portion 300c would then be appended to portions 300a and 300b to yield the complete compression unit 300. Compression unit 300 may then be decompressed.

Data blocks 320, 330, and 340 further comprise data block headers 325, 335, and 345, respectively. An example data block header is described in further detail in a subsequent section.

In an embodiment, compression unit portions are stored in data blocks that are co-located in a contiguous segment of memory or storage. Thus, the database server may retrieve the compression unit (or a contiguous set of compression unit portions) from the memory or storage in a single input/output (I/O) operation. For example, data blocks 320, 330, and 340 may be contiguous data blocks. To read these data blocks from disk, the database server need only issue a single I/O request for the range of data blocks starting with data block 320 and ending with data block 340. The compression of table data afforded by compression units, coupled with this co-location of data for compression unit portions in a contiguous range of data blocks, allows the database server to quickly read data for a table or significant portion thereof with a minimal number of I/O operations.

In an embodiment, the database server may utilize the co-location of compression unit portions in contiguous data blocks to perform prefetching. When the database server requires a data block comprising one portion of a compression unit, the database server may, in the same I/O operation, also fetch other contiguous data blocks that comprise other compression unit portions for the same compression unit, even though those compression unit portions may not yet be required. For example, if a database server were to determine that it required access to compression unit portion 300b in data block 330, the database server may also decide to fetch data blocks 320 and 340 because they are stored in a contiguous storage segment and happen to comprise other compression unit portions for compression unit 300. In this manner, the database server may preemptively cache other compression unit portions that are likely to be required in the same time frame as the first compression unit portion, thereby avoiding the need for performing subsequent I/O operations to fetch the other compression unit portions should those portions be required at a later time.

2.4. Compression Unit Row Header

According to an embodiment, the database may store metadata for each compression unit or compression unit portion to assist the database server in interpreting the data compressed in the compression unit. For example, the database server may store mapping metadata that offers both sequential access to compression unit portions and random access to compressed data for select rows and/or columns of the compression unit. A database may store metadata to assist the database server in interpreting the compression unit in a variety of locations. For example, some or all of this metadata may be stored as a separate field in the data block row, immediately preceding the compression unit or compression unit portion.

Figure 4:
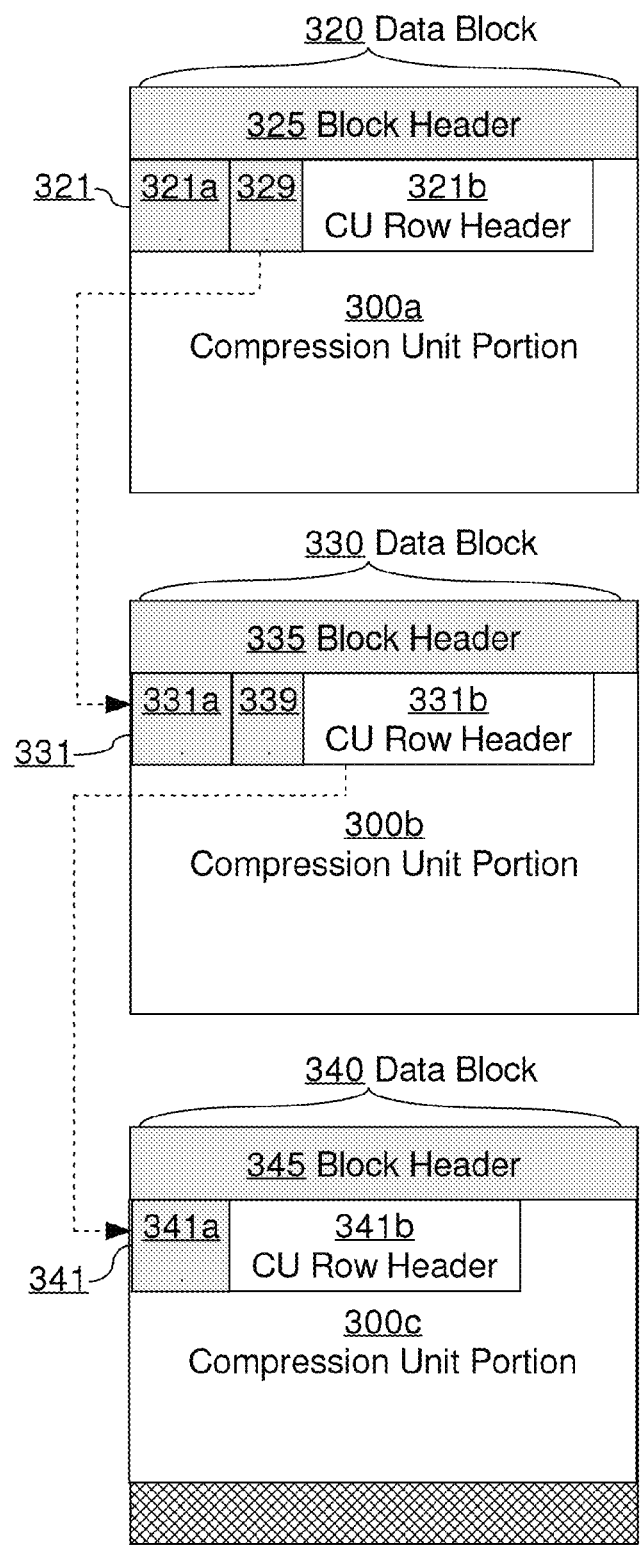
FIG. 4 illustrates example data blocks with an added compression unit row header.

FIG. 4 illustrates example data blocks 320, 330, and 340, each with an added compression unit row header for storing such metadata, according to an embodiment of the invention. For example, data block row 321 now includes a field 321b for a compression unit row header. Data block rows 331 and 341 likewise include compression unit row headers 331b and 341b. In some embodiments, compression unit row headers 331b and 341b are trivial, in that they are simply copies of compression unit row header 321b, or are empty or omitted. In other embodiments, compression unit row headers 331b and 341b may include metadata specific to compression unit portions 300b and 300c, respectively.

In an embodiment, the size of a compression unit row header is variable, thereby providing a database with the flexibility to store any of a wide variety of metadata in the compression unit row header. For example, a database sever may be configured to assume that a certain field—in this case the first field (field 321b)—is a compression unit row header, and that a second field (compression unit portion 300a) is the payload data for the compression unit itself. Since fields may be of any length (assuming the length is not greater than the data block size itself), the compression unit row header may store any amount of such metadata.

Among the types of metadata that may be useful to store in a compression unit row header are: metadata identifying the number of portions into which the compression unit has been divided, metadata identifying addresses of data blocks or data block rows at which each portion may be found, metadata identifying the size or unit-relative offset of each portion of the compression unit, metadata describing how the data in the compression unit is arranged or was compressed, metadata mapping certain rows and/or columns to certain portions of the compression unit, metadata indicating characteristics of the compression unit, metadata indicating a compression level for the compression unit, metadata indicating contiguous blocks storing the compression unit, metadata indicating the number of data block row addresses that have been allocated to the compression unit, and metadata indicating other compression units storing compressed data for the same table. Other example metadata is described in subsequent sections.

In an embodiment, some or any of the above metadata may instead be stored in other locations, such as in the data block row header, the data block header, a header inside the compression unit, or an external table.

2.5. Multiple Compression Units in a Single Data Block

While the data blocks of FIGS. 2-4 depict embodiments of the invention in which a data block may store at most a single compression unit, other embodiments of the invention allow a data block to store multiple compression units. For example, in some embodiments, different compression units based on a same table may be stored in a single data block. In some embodiments, different compression units may be stored in a single data block, regardless of whether the compression units originate from the same table. In this manner, a single data block may store archived versions of any number of tables. This technique may be particularly useful for databases with large data block sizes and many small tables, thus avoiding the need to allocate a separate data block for each table. However, this technique may also be useful in other contexts.

Figure 5:
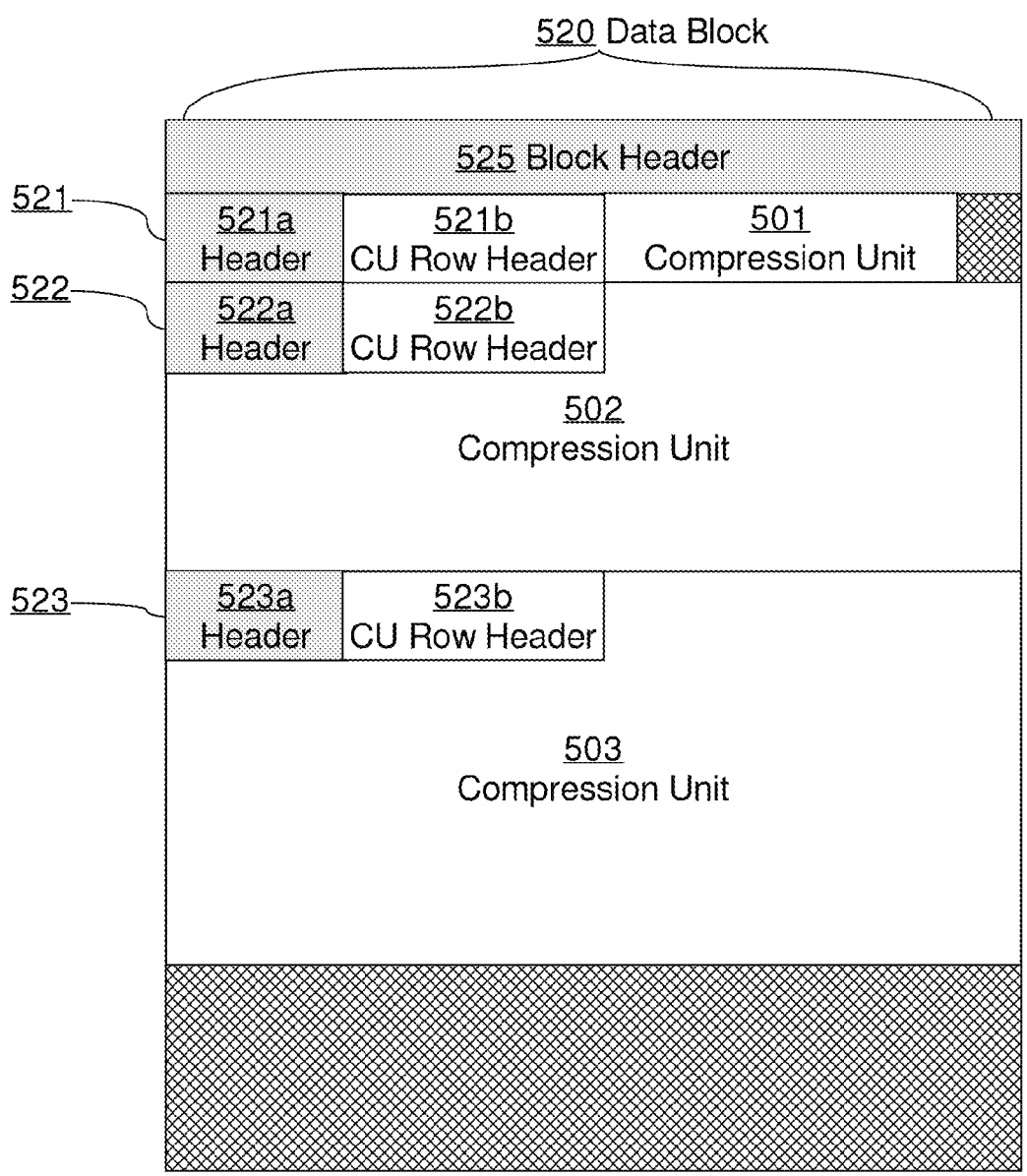
FIG. 5 illustrates a data block comprising multiple compression units.

For example, FIG. 5 illustrates a data block 520 comprising multiple compression units 501, 502, and 503. Compression unit 501 is stored in data block row 521, compression unit 502 is stored in data block row 522, and compression unit 503 is stored in data block 523. As with other data block rows depicted herein, each of data block rows 521, 522, and 523 also comprise a data block row header 521a, 522a, and 523a, respectively, and a compression unit row header 521b, 522b, and 523b, respectively. Moreover, data block 520 also comprises a data block header 525.

As depicted in FIG. 5, each data block row comprises only a single compression unit (or compression unit portion). However, in other embodiments, multiple compression units may be stored as different fields of a same data block row. The multiple compression units can belong to the same table or to different tables.

2.6. Row Addressing

Many databases store an index, such as index 150, mapping each table row in the database to a data block row. According to an embodiment of the invention, in order to provide normal access to data in compression units, a database provides a way to address each table row compressed inside of a compression unit. Like with uncompressed rows, the first portion of an address for a table row that has been compressed in a compression unit consists of a block identifier. However, instead of the second portion of the address specifying a data block row identifier, the second portion of the address specifies a row identifier relative to the compression unit.

In data blocks comprising only a single compression unit, resolution of such an address is straightforward. For example, consider the address 0320.0004. Once the database server determines that the data block 320 comprises a single compression unit, the database server would decompress the compression unit in the first data block row of data block 320. The database server would then interpret the address 0320.0004 to refer to fourth row listed in the decompressed compression unit. By contrast, the database server would interpret this address to refer to the fourth data block row of data block 320 if data block 320 had not comprised a compression unit.

In data blocks comprising multiple compression units, address resolution is more complex. For example, it may not be clear whether 0320.0004 refers to the fourth row of the compression unit in the first data block row, or the fourth row of the compression unit in the second data block row. To resolve this ambiguity, the address of each row compressed in each compression unit after the first compression unit is deemed to be offset by the total number of table rows compressed in all of the preceding compression unit. So, for example, if the first compression unit comprises compressed data for two rows, the address 0320.004 would resolve to the second decompressed row in the compression unit occupying the second data block row of data block 320.

To avoid having to decompress each compression unit so as to count the table rows stored therein, the database server may determine the number of table rows compressed in each compression unit based on size metadata in, for example, a compression unit row header.

In some embodiments, the number of table rows compressed in a compression unit may change frequently due to deletions and additions. To avoid having to update the address assigned to table rows in a compression unit whenever a table row is added or deleted in another compression unit stored in the same block, each compression unit may be allocated a certain number of rows. For example, the first compression unit may be allocated three rows. Thus, the addresses in the second compression unit would be deemed to start at 4, even if the first compression unit only contained compressed data for one table row. Metadata indicating the number of rows allocated may be stored in a suitable location such as the compression unit row header or the data block header. Or, metadata indicating a starting row offset or starting "slot" may also be stored for each compression unit.

Figure 6:
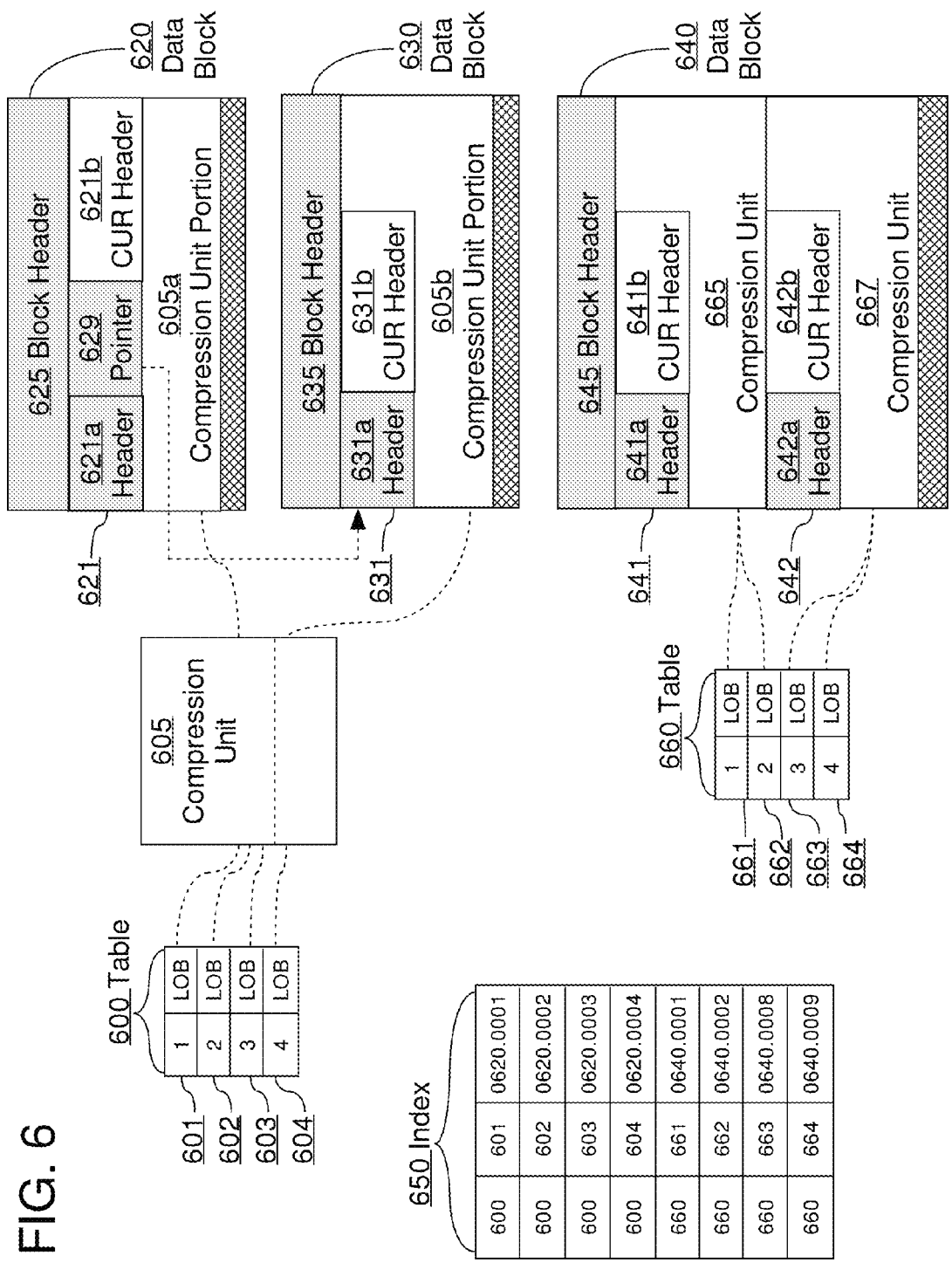
FIG. 6 illustrates a table row index in which a database server has relied upon a compression unit-based address scheme.

For example, FIG. 6 illustrates a table row index 650 in which are stored compression unit-based addresses, according to an embodiment of the invention. Table row index 650 is backwards compatible with conventional indexes, such as index 150, in that it contains no modifications to underlying index formats and structures.

Table row index 650 comprises index data for tables 600 and 660. Table 600, comprising table rows 601-604, has been compressed into compression unit 605. Compression unit 605 is divided into portions 605a and 605b, which are stored in data block row 621 of data block 620 and data block row 631 of data block 630, respectively. Table 660 comprises table rows 661-662, compressed into compression unit 665, and table rows 663-664, compressed into compression unit 667. Compression unit 665 is stored inside of data block row 641 of data block 640 and compression unit 667 is stored inside of data block row 642 of data block 640. Metadata indicating the number of rows allocated to each data block row is stored in compression unit row headers 621b, 641b, and 642b. Data block rows 621, 631, 641, and 642 also comprise data block headers 621a, 631a, 641a, and 642a, respectively.

Table row index 650 indexes each of table rows 601-604 and 661-664 using the address scheme described above. Table rows 601-604 are indexed to the first four rows of compression unit 605 in data block 620. Table rows 661-662 are indexed to the first two rows of compression unit 665 of data block 640.

Table rows 663-664 are indexed to rowids 8-9 of data block 640. Since, as depicted in compression unit row header 641b, compression unit 665 is allocated seven rows, a database server will subtract this offset from the rowids for rows 663-664, thus resolving the addresses 0660.0008 and 0660.0009 to the first two rows of compression unit 667.

Other addressing schemes may also be used. For example, according to an embodiment, all table rows in a compressed unit are indexed directly to the data block row in which they are stored. Since many table rows may be compressed in a single compression unit and then stored in a single data block row, a database server must be configured to employ additional steps to locate the table rows within the compressed unit, such as consulting metadata in the compression unit or the compression unit header.

2.7. Data Block Header and Row Headers

To assist the database server in interpreting data blocks that comprise compression units, it may be desirable to add various items of metadata to the data block header itself. Many of the metadata items already discussed may be stored in a data block header. Additionally, a data block header may store metadata indicating whether or not a data block comprises compression units. Such metadata may be in the form of, for example, a compression flag or byte.

It may also be desirable to store some of the metadata described herein in a data block row header. In contrast to metadata stored at the data block header level, metadata stored at the data block row level may be made to apply only to the data block row as opposed to the data block as a whole. For instance, a first data block row header in a data block may include metadata indicating that its associated data block row comprises a compression unit, whereas a second data block row header in the same data block may include metadata indicating that its associated data block row does not comprise a compression unit.

According to an embodiment, any or all of the information described herein as being stored in a data block header may instead be stored in one or more locations external to the data block. In fact, a data block may not necessarily comprise a data block header at all.

3.0. Functional Overview 3.1. Generating and Storing Compression Units

Figure 7:
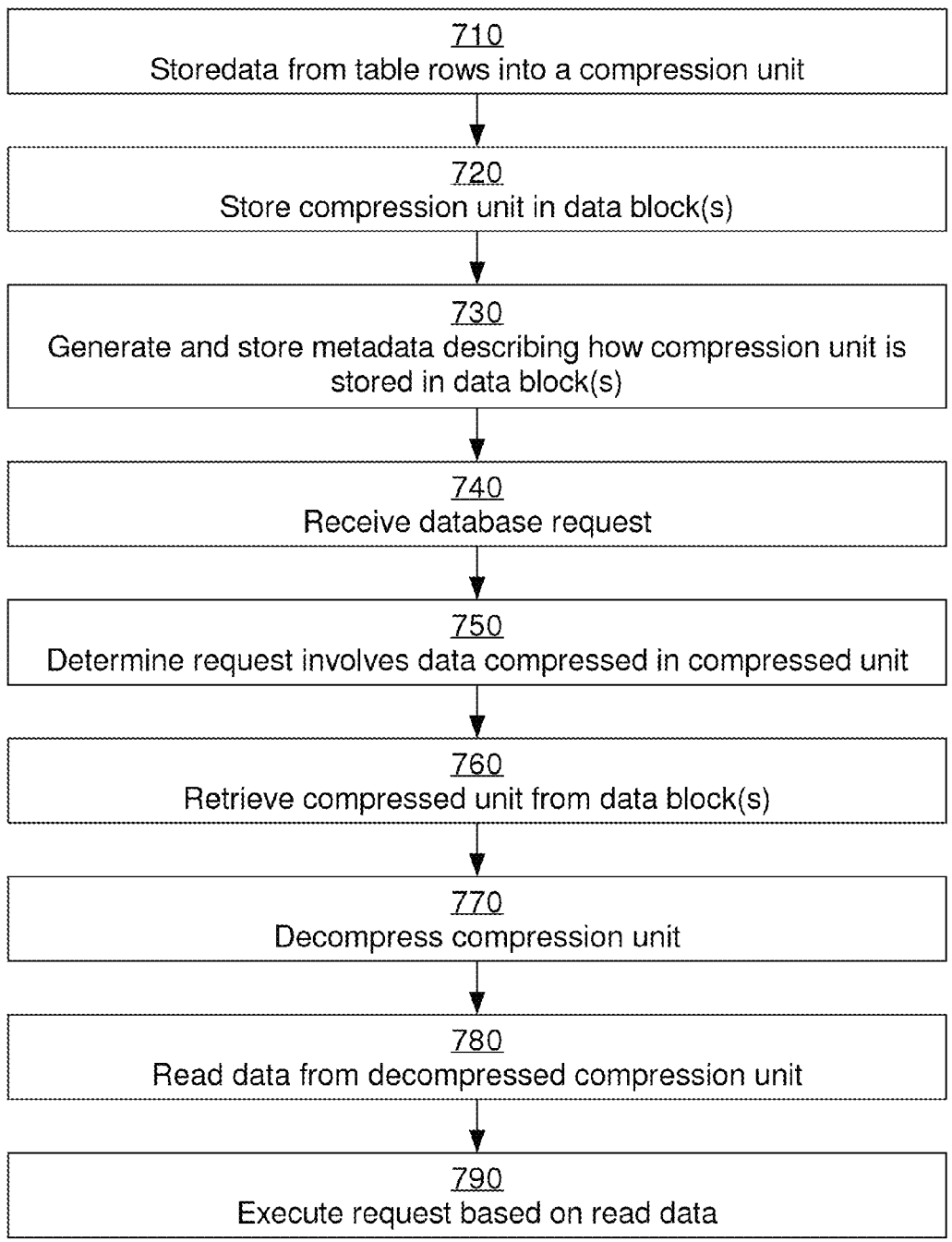
FIG. 7 is a flowchart illustrating a method for utilizing data blocks for storing units of data.

FIG. 7 is a flowchart 700 illustrating a method for utilizing data blocks for storing units of data, according to an embodiment of the invention. The steps of FIG. 7 constitute merely one of many methods that may be performed to store and utilize compression units in data blocks. Other methods may include more or fewer steps in other orders than depicted in FIG. 7.

At step 710, a database server stores data from table rows in a table, such as table 100, into a compression unit, such as any of the example compression units described herein. The data may be compressed using any known lossless technique. The database server may always use the same technique, or the database server may use a different technique depending on the nature of the data in the compression unit. To assist the database server in decompressing the compression unit, the database server may generate metadata indicating the technique used, and then store the metadata in the compression unit or at some other location. As discussed above, the data may comprise data for the entire table or data from a selected subset of the table. In an embodiment, the compression unit includes compressed data from at least two or more table rows.

In an embodiment, step 710 comprises compressing the table rows into a smaller, compressed format. In an embodiment, step 710—and, as used herein, the process of storing data into a compression unit in general—does not necessarily involve compressing the data into a smaller, compressed format, but rather may simply involve wrapping the table rows within the compression unit.

At step 720, the database server stores the compression unit in one or more data blocks. Assuming the compression unit is smaller than some threshold size relative to the target data block size, the compression unit may be placed entirely within a single data block. Otherwise, the compression unit is divided into portions, with each portion being stored in a different data block. In an embodiment, each portion (or the entire compression unit if the compression unit remains undivided) is stored entirely as row data within a single data block row of the data block in which the portion is stored. In an embodiment, each portion (or the entire compression unit) is stored as a variable-length field of its respective data block row. In an embodiment, each portion of the compression unit comprises compressed data from a plurality of table rows from the table.

At step 730, which may occur at any time relative to step 720, the database server may generate and store metadata to assist the database server in subsequently accessing the data that has been compressed into the compression unit. For example, the database server may generate metadata indicating that the data blocks or data block row headers at which the compression unit is stored are to be interpreted as storing a compression unit or compression unit portion (as opposed to, for example, fields of uncompressed values). As another example, the database server may generate metadata indexing each compressed table row to an address such as described in previous sections. As another example, the database server may generate metadata indicating the size and location of each portion. As another example, the database server may generate metadata for certain compression unit portions pointing to the data block or data block row at which the next compression unit portion may be found. As another example, the database server may generate metadata indicating the location within the compression unit of the compressed data for certain table rows and/or table columns. The database server may store such metadata in a variety of locations, including a compression unit row header, data block row header, data block header, and/or index, as discussed in previous sections.

At step 740, occurring some time after completion of steps 710-730, the database server may receive a request, such as a query or other database statement.

At step 750, the database server may determine that the request requires access to data that was stored into the compression unit during step 710. For example, the request may have been a query that requests values from a certain column for each row of a table that has been compressed inside of the compression unit. Or, the request may have been a query that requests values from a specific row of a table that has been compressed inside of the compression unit.

At step 760, the database server retrieves the compression unit from the one or more data blocks at which the compression unit is stored. For example, the database server may utilize metadata in the database, including the metadata generated in step 730, to locate each data block row at which the compression unit (or portion thereof) is stored. The compression unit (or compression unit portions) may then be retrieved from the data block row or rows in the same manner as the database server would retrieve an uncompressed column value from a field of a conventional data block row. If multiple compression unit portions are involved, the database server appends the compression unit portions to each other to yield the complete compression unit.

In an embodiment, the process of locating each data block row may comprise searching an index to determine which data blocks or data block rows are assigned to the implicated table or table rows. In some embodiments featuring a compression unit that has been chained across multiple data blocks, the index may only indicate an initial data block or data block row assigned to the table or table row. Thus, the database server may locate the first portion of the compression unit in that initial data block, then access other metadata (such as pointer 329 or 339) to follow the chain of data blocks and locate the remaining compression unit portions.

At step 770, the database server decompresses the compression unit, thereby yielding a decompressed compression unit. This decompressed compression unit is, essentially, the same table or table subset that was stored in the compression unit step 710. The exact technique used to decompress the compression unit will depend on the manner in which the data was stored in step 710. In some embodiments, the decompression technique is discernable from the compression unit itself, or from metadata that was generated in step 710. In an embodiment the decompression of step 770 involves expanding smaller data in a compressed format into uncompressed data for the table. In another embodiment, step 770, and, as used herein, the process of decompressing a compression unit in general, entails simply unwrapping the table rows from the compression unit—e.g. removing compression unit headers—and does not necessarily involve expansion of the smaller, compressed data into table rows.

In an embodiment, the decompressed compression unit is placed in a temporary memory, such as a reusable buffer. The database server may be configured to first check this buffer prior to hitting the database for data to see if the data has already been retrieved and decompressed.

At step 780, the data to execute the request is retrieved in uncompressed form from the decompressed compression unit.

At step 790, the request is executed based on the retrieved data.

In the event that the table whose data was compressed in step 710 comprises other data that has been compressed in other compression units, steps 760-770 may also be performed with respect to the other compression units, and the resulting other decompressed compression units may be combined with the first decompressed compression unit prior to data retrieval in step 780. In the event that the table comprises other data that is not stored in a compression unit, that data may also be combined with the decompressed compression unit prior to step 780. However, in some embodiments, such steps are taken only if execution of the request of step 740 also requires access to the other data in the table.

3.2. Maintaining Compatibility with Conventional Data Blocks

According to an embodiment, a database includes both data blocks that store compression units and data blocks that store uncompressed data or data that has been compressed using conventional techniques. To ensure that both types of data blocks are properly interpreted, the database server must be configured with logic to differentiate between data block rows that comprise compression units and other data block rows. The database server must further be configured to interpret data block rows that comprise compression units differently than other data block rows.

Figure 8:
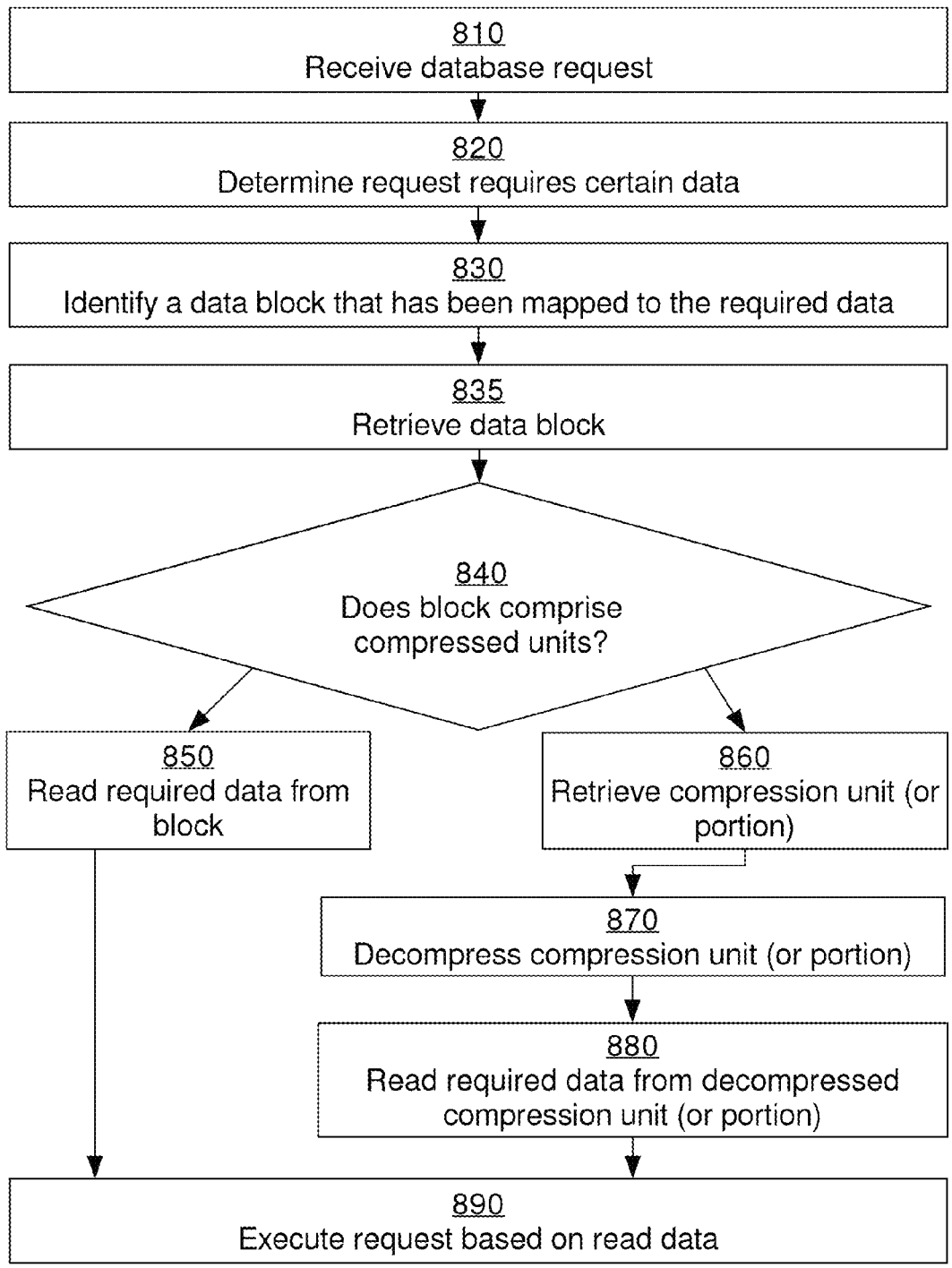
FIG. 8 is a flowchart illustrating a method for differentiating between data block rows that hold compression units and other data block rows.

FIG. 8 is a flowchart 800 illustrating a method for differentiating between data block rows storing compression units and other data block rows, according to an embodiment of the invention. The steps of FIG. 8 constitute merely one of many methods for performing this task. Other methods may include more or fewer steps in other orders than depicted in FIG. 8.

The example method of FIG. 8 assumes that a compression unit has already been stored within one or more data block rows, per, for example, steps 710-730. The example method further assumes that the database stores metadata indicating data blocks or data block rows that comprise compression units. Such metadata may have been generated, for example, in step 730. Such metadata may be, for example, a Boolean flag or other field in data block header or row header. Or, such metadata may be stored in a separate table, index, or list.

At step 810, the database server receives a request to perform a database operation, such as query or other database statement.

At step 820, the database server determines that, to respond to the request, the database server must access certain required data. For example, the request may be a query for all column values from a certain table. Or, the request may be a query for certain values from a particular table row.

At step 830, the database server searches database metadata to identify a data block or data block row that has been mapped to the required data. For example, in the case of requiring access to a table in general, the database server may consult a table index to identify a data block mapped to the table. Or, in the case of requiring access to a particular table row, the database server may consult a row index to identify a unique rowid—including a block-relative row number and an identifier for a mapped data block—by which the data for the particular table row is addressed.

At step 835, the database server retrieves the mapped data block from disk.

At step 840, the database server determines whether the database stores metadata indicating that the mapped data block (or the data block in which the mapped data block row is located) stores one or more compression units. As explained above, such metadata may be stored, for instance, as a flag or other field in the data block header.

If, at step 840, the database server determines that such metadata does not exist, then at step 850 the database server reads the required data from the mapped data block using conventional techniques, including chaining if necessary. For example, if the required data constitutes an entire table, the database server will read and interpret the raw data in each data block row. Or, if the required data constitutes only data from a particular table row, the database server will read and interpret the required data directly from the data block row whose identifier matches the row number indicated in the mapped rowid. In an embodiment, step 850 is performed without decompressing any portion of the data block row. In an embodiment, certain column values may require decompression per conventional, block-based techniques. Flow then continues to step 890 below.

If, at step 840, the database server determines that such metadata does exist, the database server assumes that the required data has been compressed in a compression unit using steps such as step 710 of FIG. 7. Thus, at step 860, the database server reads the compression unit (or a portion thereof) from the mapped data block. To do so, the database server must locate the data block row in which the compression unit is stored. Once the appropriate data block row has been identified, the database server may retrieve the compression unit (or suitable portions thereof), using techniques such as explained elsewhere in this application.

For example, if the required data is an entire table, the database server may look in the data block for metadata indicating a data block row number at which a compression unit for the table is located. Or, if the required data is a table row, the database server may access metadata indicating the addresses allocated to each compression unit in the data block. The database server may then select the data block row storing a compression unit whose allocated addresses include a match for the row identifier portion of the rowid. Note that, in most cases, the row number of the selected data block row will not match the row identifier portion of the rowid, as the row identifier in the rowid is interpreted to refer to a row compressed within the compression unit and not the data block row itself.

At step 870, the database server decompresses the compression unit (or a portion thereof), again using techniques such as explained elsewhere in this application.

At step 880, the database server reads the required data directly from the decompressed compression unit. For example, if the required data constitutes an entire table, the database server may simply read the decompressed compression unit en masse. If the required data is only a table row, the database server uses the row identifier from the rowid (minus any applicable offset) to locate the table row in the decompressed compression unit and then reads the raw data for the table row directly from the decompressed compression unit.

At step 890, once the database server has read the required data, the database server executes the request based on the read data.

3.3. Accessing Compressed Data without Decompressing the Entire Compression Unit According to an embodiment, a database server may utilize compression units more efficiently by avoiding decompression of compression unit portions that do not comprise data to which the database server requires access. Further benefits arise out of such behavior when each compression unit portion is stored in a different data block, thereby avoiding the need for the database server to read from disk those data blocks containing the portions that do not require decompression.

To facilitate this behavior, the database server may store metadata for a compression unit identifying locations at which the compressed data for certain columns or rows is held. Based on this information, whenever the database server receives a request that only asks for data from the certain rows or certain columns, the database server may determine exactly which set of portions must be decompressed, or at least one or more portions that do not comprise the data from the certain rows or columns. The database server may then avoid decompressing one or more other portions that do not comprise the data from the certain rows or columns. In some embodiments, the database server also avoids retrieving disk blocks associated with those portions.

In some embodiments, regardless of whether the portion comprises data from the certain rows or columns, the database server may nonetheless retrieve a portion of the compression unit storing metadata useful in interpreting the compression unit, such as a decompression dictionary along with metadata describing the compression algorithm used. This portion may be, for example, the first portion of the compression unit, at which may be stored a compression unit header.

According to an embodiment, an index associating certain rows and/or columns with their respective locations and sizes may be stored directly in, for example, a compression unit row header or data block row header. In an embodiment, a compression unit row header stores only metadata indicating, for each compression unit portion, the size of the portion and an address of the data block or data block row at which the portion is stored. However, the database may store metadata associating certain rows and/or columns with compression-unit relative addresses and sizes. In conjunction with the information in the compression unit row header, this information allows the database server to determine which compression unit portions store the certain rows and/or columns.

For example, returning to FIG. 3, compression unit 300 may comprise compressed data for a table comprising columns 1-30. A database server may receive a request for access to columns 6-14 of the table. Data block row 321 may include a compression unit row header indicating that compression unit is divided into three portions: portion 300*a* of size 7000 bytes, portion 300*b*, also of size 7000 bytes, and portion 300*c*, of size 5000 bytes. To determine which portions comprise columns 6-14, the database server may read the compression unit header for compression unit 300, which may be stored as uncompressed data in portion 300*a*. Based on a directory in this header, the database server may determine that the compressed data for columns 6-14 is stored at an offset of 6000 bytes, and is 4000 bytes in size. Consequently, the database server may determine that it only needs to read bytes 6000-9999 of the compression unit. Based on the compression unit row header, the database server knows that these bytes are stored in portions 300a and 300b. The database server thus decompresses only portions 300a and 300b, without decompressing portion 300c. In fact, the database server is not even required to read data block 340.

Figure 9:
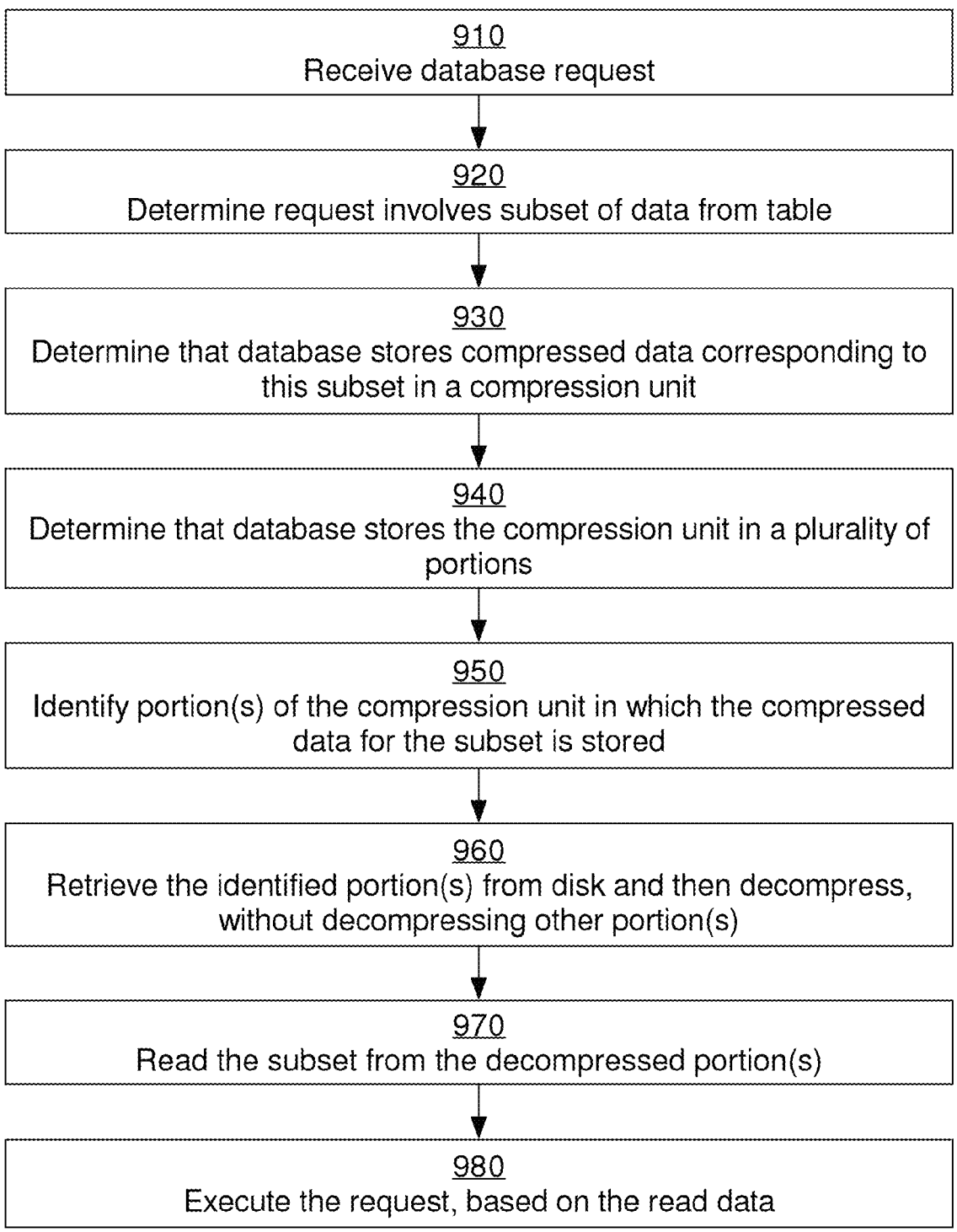
FIG. 9 is a flowchart illustrating a method for accessing data that has been compressed in a compression unit without decompressing at least one portion of the compression unit.

FIG. 9 is a flowchart 900 illustrating a method for accessing data that has been compressed in a compression unit, without decompressing at least one portion of the compression unit. The steps of FIG. 9 constitute merely one of many methods for performing this task. Other methods may include more or fewer steps in other orders than depicted in FIG. 9.

The example method of FIG. 9 assumes that a compression unit has already been stored as multiple portions in multiple data block rows, per, for example, steps 710-730. The example method further assumes that the database stores metadata indicating the compression unit portion or portions in which data for certain rows and/or certain columns resides, using techniques such as explained above.

At step 910, a database server receives a request, such as a query or other database statement.

At step 920, the database server determines that execution of the request requires access to a subset of data in a table. The required data may be, for instance, a subset of column values for certain rows in a table.

At step 930, the database server determines that the database stores compressed data corresponding to this required data in a compression unit. For example, upon inspecting the data block at which the database indicates the required data is located, the database server may determine that the data block stores compression units.

At step 940, the database server determines that the database stores the compression unit in a plurality of portions. This determination may occur on the basis of, for example, metadata in a row header or compression unit row header.

At step 950, the database server may identify a first set of one or more portions of the compression unit in which the compressed data for the required data is stored. The database server may accomplish this step by, for example, analyzing metadata that describes the sizes and locations of certain rows, columns, and/or portions, as explained above.

At step 960, the database server may retrieve the first set of one or more portions of the compression unit from disk and then decompress the first set of one or more portions of the compression unit using techniques such as described in the sections above, thereby producing a set of one or more decompressed portions of the compression unit.

At step 970, the database server reads the required data in the set of one or more decompressed portions of the compression unit.

At step 980, the database server executes the request, based on at least one or more items in the read data.

The compression unit involved in this method also contains a second set of one or more portions that is different from the first set of one or more portions. Steps 910-980 are performed without decompressing this second set of one or more portions.

3.4. Predicate Filtering Optimizations

According to an embodiment, a database server may store metadata indicating, for some or all portions of a compression unit, a range of values for some or all of the columns of the table rows stored therein. This metadata may be stored in any of the locations discussed herein, including data block headers, row headers, and/or a system table. For each particular column for which a range is specified in metadata associated with a particular compression unit portion, the metadata indicates that no table row in the particular portion of the compression unit comprises a value that is outside of the range. The range may be defined, for example, by minimum and maximum values.

When the database server receives a request for data from a table in a compression unit, the database server may utilize this metadata to assist in evaluation of any predicates associated with columns for which ranges have been specified. Based on the predicate and the metadata, for example, the database server may easily determine whether a particular compression unit stores any rows that match the predicate. If any rows in a portion could possibly match the predicate, the compression unit should be decompressed; otherwise, the database server can avoid decompression of the compression unit.

Such metadata may be useful, for example, where compression unit portions have been divided based upon range partitioning of a certain column, such as a primary key. For example, metadata for a compression may specify that a column "ID" of a certain compression unit portion ranges from 100 to 200. If the database server receives a request that includes a predicate specifying ID=345, the database server may safely ignore the compression unit portion. However, if the database server receives a request that includes a predicate ID<150, the database server will need to decompress the compression unit.

In an embodiment, metadata may also or instead specify a set of enumerated values possessed by certain columns of table rows in a compression unit portion.

3.5. Selective Decompression of Retrieved Compression Unit Portions

In an embodiment, the database server may further perform yet another level of selection after it has already retrieved compression unit portions from disk, in that it may selectively decompress only certain bytes of a retrieved compression unit or compression unit portions. For example, the database may discover that, after decompressing the first 1000 bytes of a compression unit portion, it has already decompressed all of the rows necessary to respond to the request. Thus, the database server does not decompress the remaining bytes in the compression unit portion. Selective decompression of retrieved compression unit portions may also be based on metadata within the compression unit portion permitting random access to compressed data for various table rows.

Because embodiments of the invention may employ this level of selective decompression, the act of decompressing only a part of a retrieved compression unit or portion should be understood to constitute the act of decompressing a compression unit or portion as referred to herein.

If a later operation hits a retrieved compression unit portion that is only partly decompressed while the compression unit portion is still in cache, and the later operation requires access to additional data in the compression unit portion that has not been decompressed, the later operation may selectively decompress the additional data as well.

The additional data may then be buffered along with the originally decompressed data from the compression unit portion.

3.6. Deleting Table Rows that have been Compressed

In an embodiment, prior to deleting a table row, a database server is configured to check for metadata indicating that a data block or data block row header comprises a compression unit. If no such metadata exists, the database server simply takes normal measures to delete the table row, such as setting a deleted flag in the data block row header for the table row. However, if such metadata exists, the database server does not make any changes to the data block row header, as doing so will effectively delete the entire compression unit. Instead, the database server is configured to mark the row as deleted in the uncompressed header of the compression unit itself. In an embodiment, the database server is configured to rebuild the compression unit, with the indicated table row having been deleted.

3.7. Locking Table Rows that have been Compressed

In an embodiment, when locking a table row, a database server sets locking metadata for the entire data block row, effectively locking the entire compression unit. Locking the entire compression unit may be especially desirable in compression units with more complex compression, where it may be impossible to isolate data for just one table row. However, in other embodiments, the database server maintains locking metadata for each table row compressed in the compression unit. In an embodiment, the database server instead maintains separate locks for every row in the compression unit.

3.8. Accessing Multiple Portions of a Compression Unit in a Single Read Operation According to an embodiment, the compression unit row header may include metadata indicating contiguous blocks that store chained portions of the compression unit. For example, a compression unit row header at block 29 may indicate that blocks 30-40 also include portions of the compression unit. Since these blocks are contiguous, the database server may utilize this information to fetch all of data blocks 30-40 in a single read operation. Without such information, the database server may have instead been required to read block 29, look for a pointer indicating the next block in the chain (in this case 30), read block 30, look for a pointer to the next block in the chain (in this case 31), and so on down the chain.

4.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
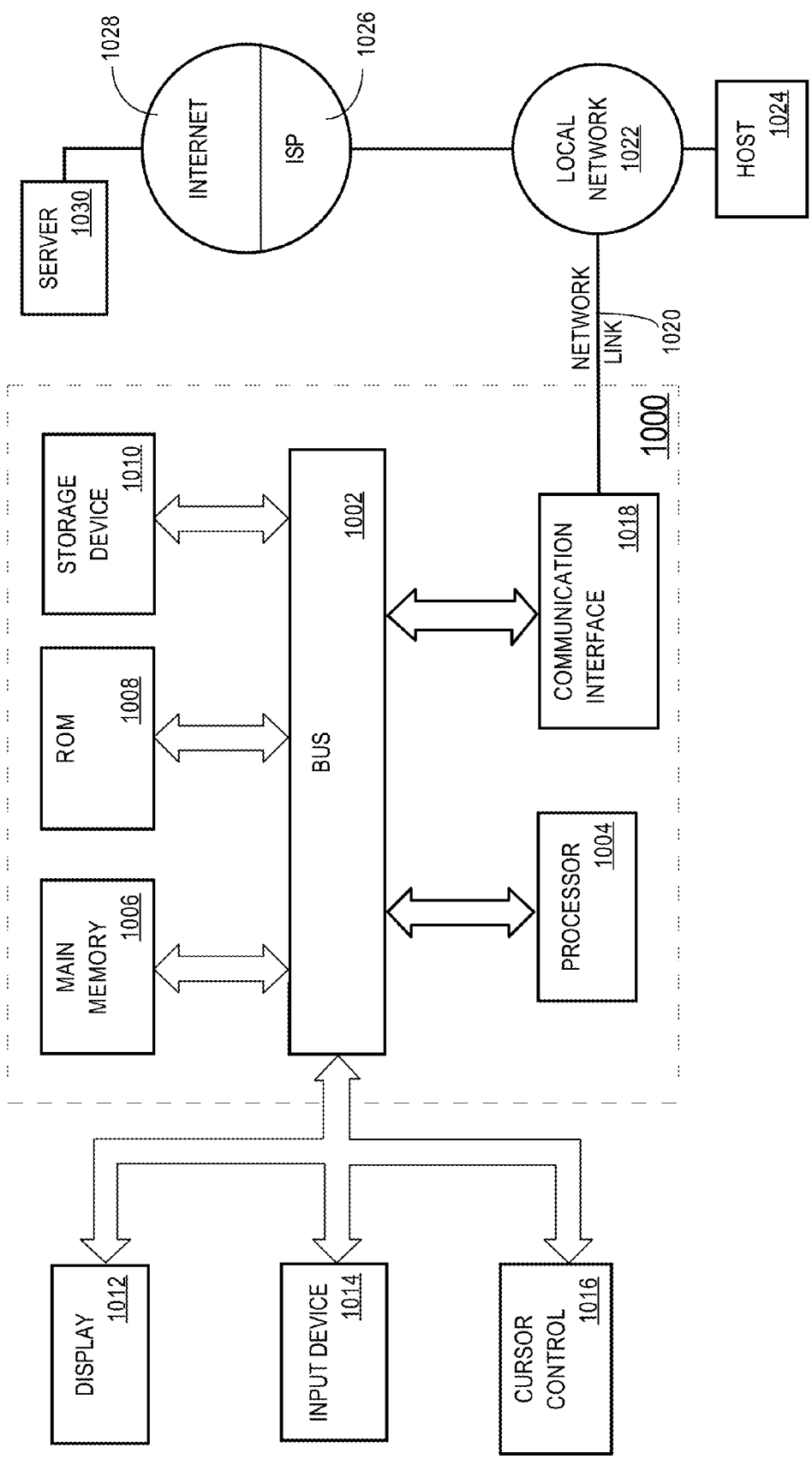
FIG. 10 is a block diagram of a computing device upon which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

5.0. Extensions and Alternatives

In an embodiment, other database structures such as indexes may also be compressed into compression unit and then stored in data blocks. Although most of the examples of this application discuss compression units for tables, many of the described techniques are just as applicable compression units for other structures.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    storing data for database tables in a storage device, the storage device comprising a memory organized into data blocks conforming to a data block format, the data block format including data block metadata and one or more data block rows;
    storing uncompressed data for a first plurality of the database tables in a first set of the data blocks, each data block of the first set of the data blocks comprising a plurality of data block rows, each data block row of the plurality of data block rows storing data from only one table row from the first plurality of the database tables;
    for a particular table that is not in the first plurality of the database tables, generating compressed data by compressing data from multiple table rows in the particular table, wherein said compressing comprises generating the compressed data and structuring the compressed data in a compression unit that does not conforms to the data block format;
    storing the compression unit in one or more data block rows of a second set of one or more of the data blocks, said storing comprising storing at least a portion of the compression unit in a particular data block row of a particular data block of the data blocks;
        wherein the portion of the compression unit comprises compressed data from a plurality of the table rows from the particular table, wherein the particular data block row thus comprises compressed data from the plurality of the table rows;
    wherein the method is performed by one or more computing devices.

2. The method of claim 1, wherein the particular data block comprises a header and one or more data block rows, the one or more data block rows including the particular data block row that stores the compression unit, wherein the particular data block row comprises a row header and a column field, wherein the column field comprises said portion of the compression unit.

3. The method of claim 1, further comprising:
    determining that execution of a request requires access to first data in said particular table;
    retrieving, from the particular data block row, the portion of the compression unit;
    decompressing the portion of the compression unit, thereby yielding an decompressed portion of the compression unit;
    locating the first data in the decompressed portion of the compression unit;
    executing the request, based at least partially on one or more items from the first data.

4. The method of claim 3, further comprising storing the decompressed portion in a re-usable buffer.

5. The method of claim 1, wherein the data that is compressed is a subset of the particular table, said subset including first data from a first set of one or more columns of the particular table, but not including second data from a second set of one or more columns of the particular table.

6. The method of claim 1, wherein:
    the portion of the compression unit is a first portion of the compression unit;
    the method further comprises:
        storing a second portion of the compression unit in a second data block row of a second data block.

7. The method of claim 6, further comprising:
    determining that execution of a request requires access to first data in the particular table;
    retrieving, from data block rows in each of a set of data blocks, a set of portions of the compression unit;
        wherein the set of data blocks includes the particular data block and the second data block;
        wherein the set of portions includes the first portion and the second portion,
    decompressing the set of portions, thereby yielding a decompressed set of portions;
    locating the first data in the decompressed set of portions;
    executing the request, based at least partially on one or more items from the first data.

8. The method of claim 1, further comprising storing compression unit metadata describing properties of the compression unit.

9. The method of claim 8, wherein the compression unit metadata is stored within the particular data block in a field of the particular data block row that precedes the portion of the compression unit.

10. The method of claim 8, further comprising determining how to retrieve the data stored into the compression unit based at least in part on the compression unit metadata.

11. The method of claim 8, wherein the compression unit metadata includes metadata indicating a data block address for each portion of the compression unit.

12. The method of claim 1, further comprising storing first metadata indicating that the particular data block consists of compressed data, wherein the database further stores second metadata indicating that one or more other data blocks consist of non-compressed data.

13. The method of claim 1, further comprising:
    storing second data from table rows in a second table into a second compression unit;
    storing at least a portion of the second compression unit in a different data block row of the particular data block in the database;
        wherein the portion of the second compression unit comprises compressed data from a plurality of table rows from the second table.

14. The method of claim 1, wherein the plurality of the table rows is compressed inside of the compression unit, the method further comprising:
    storing uncompressed data in a different data block row of the particular data block;
    storing metadata in the particular data block indicating a) that the particular data block row storing the compression unit stores compressed data; and b) that the different data block row stores uncompressed data.

15. The method of claim 1, further comprising:
    storing metadata indicating, for the portion of the compression unit, a range of values for a particular column, wherein no table row in the portion of the compression unit comprises a value for the particular column that is outside of the range;
    receiving a request for data from the particular table, said request including a predicate based upon the particular column;
    in response to the request, determining whether to decompress the portion of the compression unit based upon the metadata and the predicate.

16. A method comprising:
    storing data for database tables in a storage device, the storage device comprising memory organized into data blocks conforming to a data block format, the data block format including data block metadata and one or more data block rows;
    storing uncompressed data for a first plurality of the database tables in a first plurality of the data blocks, each data block of the first plurality of the data blocks comprising a plurality of data block rows, each data block row of the plurality of data block rows storing data from only one table row from the first plurality of the database tables;
    storing, within a second plurality of data blocks of a database, compression units comprising compressed data from tables, the compression units comprising compressed data structured in a format that does not conform to the data block format;
    determining that execution of a database request requires access to data from at least one or more table rows;
    retrieving one or more data blocks to which the one or more table rows have been mapped;
    determining whether the one or more retrieved data blocks store any of the table rows in one or more of the compression units; and
    responsive to determining that the one or more retrieved data blocks store data for a particular table row of the one or more table rows in one or more particular compression units of the compression units:
        based at least partially on information in the one or more retrieved data blocks, locating at least a portion of the compression unit in a data block row of the one or more retrieved data blocks,
        generating a decompressed portion of the compression unit, comprising data from a plurality of table rows, by decompressing the portion of the compression unit from the located data block row;
        locating the data for the particular table row in the decompressed portion of the compression unit;
        reading one or more items indicated by the database request from the data for the particular table row; and
        executing the database request based at least on the one or more items that were read from the data for the particular table row;
    wherein the method is performed by one or more computing devices.

17. The method of claim 16, further comprising,
    responsive to determining that the one or more retrieved data blocks store data from a second table row of the one or more table rows in uncompressed form outside of any of the compression units:
        locating within the one or more retrieved data blocks a data block row storing raw data for the second table row;
        reading one or more items indicated by the database request from the data block row; and
        executing the database request based at least on the one or more items that were read from the data for the second table row.

18. The method of claim 16, wherein the portion of the compression unit comprises the entire compression unit.

19. The method of claim 16, wherein the decompressed portion of the compression unit comprises an entire table.

20. The method of claim 16, wherein the portion of the compression unit is at least partially located in multiple data blocks.

21. The method of claim 16, further comprising:
    locating, in an index, an entry associating the particular table row with at least a) an address of a particular data block of the one or more data blocks and b) a row identifier within the particular data block;

wherein the step of retrieving the one or more data blocks comprises locating the particular data block based on the address of the particular data block that was indicated by the index; and wherein the step of locating the table row in the decompressed portion of the compression unit is based on the row identifier.

22. A method comprising:

storing data for database tables in a storage device, the storage device comprising a. memory organized into data blocks conforming to a data block format, the data block format including data block metadata and one or more data block rows;

compressing a particular database table within a particular compression unit, the compression unit comprising compressed data from the table structured in a format that is different than the data block format;

dividing the particular compression unit into portions;

based on the divided portions, storing the compression unit within a plurality of data blocks of a database, wherein the compression unit spans the plurality of data blocks, each data block of the plurality of data blocks comprising one or more different portions of the divided portions;

receiving a request whose execution requires access to first data from the particular database table;

determining that the database stores the first data in the particular compression unit;

determining that the first data is stored in a first set of one or more portions of the divided portions of the particular compression unit;

retrieving the first set of one or more portions from one or more data blocks of the plurality of data blocks;

decompressing the first set of one or more portions, thereby yielding one or more decompressed portions of the particular compression unit;

locating the first data in the decompressed portion of the particular compression unit;

executing the request based at least partially on one or more items from the first data;

wherein the method is performed by one or more computing devices.

23. The method of claim 22, wherein the method is performed without having decompressed a second set of one or more portions of the divided portions of the particular compression unit.

24. The method of claim 22, further comprising retrieving, responsive to the request, only the one or more data blocks that store the first set of one or more portions of the particular compression unit, and not one or more other data blocks that store the second set of one or more portions of the particular compression unit.

25. The method of claim 24, further comprising identifying the first set of one or more portions of the compression unit, based at least partially on portion mapping data stored immediately preceding a particular portion of the compression unit within a first data block of said plurality of data blocks, said portion mapping data indicating, for each portion of the divided portions, a block at which the portion is located.

26. The method of claim 23, further comprising identifying the first set of one or more portions of the compression unit, based at least partially on metadata indicating that the first data is stored in certain portions of the compression unit.

27. The method of claim 1, wherein generating the compressed data comprises utilizing non-block-based compression to compress the data from the multiple table rows.

28. One or more non-transitory computer-readable storage media storing instructions that, when executed by one or more computing devices, cause performance of:

storing data for database tables in a storage device, the storage device comprising a memory organized into data blocks conforming to a data block format, the data block format including data block metadata and one or more data block rows;

storing uncompressed data for a first plurality of the database tables in a first set of the data blocks, each data block of the first set of the data blocks comprising a plurality of data block rows, each data block row of the plurality of data block rows storing data from only one table row from the first plurality of the database tables;

for a particular table that is not in the first plurality of the database tables, generating compressed data by compressing data from multiple table rows in the particular table, wherein said compressing comprises generating the compressed data and structuring the compressed data in a compression unit that does not conform to the data block format;

storing the compression unit in one or more data block rows of a second set of one or more of the data blocks, said storing comprising storing at least a portion of the compression unit in a particular data block row of a particular data block of the data blocks;

wherein the portion of the compression unit comprises compressed data from a plurality of the table rows from the particular table, wherein the particular data block row thus comprises compressed data from the plurality of the table rows.

29. The one or more non-transitory computer-readable storage media of claim 28, wherein the particular data block comprises a header and one or more data block rows, the one or more data block rows including the particular data block row that stores the compression unit, wherein the particular data block row comprises a row header and a column field, wherein the column field comprises said portion of the compression unit.

30. The one or more non-transitory computer-readable storage media of claim 28, wherein the instructions, when executed by the one or more computing devices, further cause:

determining that execution of a request requires access to first data in said particular table;

retrieving, from the particular data block row, the portion of the compression unit;

decompressing the portion of the compression unit, thereby yielding an decompressed portion of the compression unit;

locating the first data in the decompressed portion of the compression unit;

executing the request, based at least partially on one or more items from the first data.

31. The one or more non-transitory computer-readable storage media of claim 28, wherein the instructions, when executed by the one or more computing devices, further cause storing the decompressed portion in a re-usable buffer.

32. The one or more non-transitory computer-readable storage media of claim 28, wherein the data that is compressed is a subset of the particular table, said subset including first data from a first set of one or more columns of the particular table, but not including second data from a second set of one or more columns of the particular table.

33. The one or more non-transitory computer-readable storage media of claim 28, wherein:

the portion of the compression unit is a first portion of the compression unit;
wherein the instructions, when executed by the one or more computing devices, further cause:
storing a second portion of the compression unit in a second data block row of a second data block.

34. The one or more non-transitory computer-readable storage media of claim 33, wherein the instructions, when executed by the one or more computing devices, further cause:
determining that execution of a request requires access to first data in the particular table;
retrieving, from data block rows in each of a set of data blocks, a set of portions of the compression unit;
wherein the set of data blocks includes the particular data block and the second data block;
wherein the set of portions includes the first portion and the second portion, decompressing the set of portions, thereby yielding a decompressed set of portions;
locating the first data in the decompressed set of portions;
executing the request, based at least partially on one or more items from the first data.

35. The one or more non-transitory computer-readable storage media of claim 28, wherein the instructions, when executed by the one or more computing devices, further cause storing compression unit metadata describing properties of the compression unit.

36. The one or more non-transitory computer-readable storage media of claim 35, wherein the compression unit metadata is stored within the particular data block in a field of the particular data block row that precedes the portion of the compression unit.

37. The one or more non-transitory computer-readable storage media of claim 35, wherein the instructions, when executed by the one or more computing devices, further cause determining how to retrieve the data stored in the compression unit based at least in part on the compression unit metadata.

38. The one or more non-transitory computer-readable storage media of claim 35, wherein the compression unit metadata includes metadata indicating a data block address for each portion of the compression unit.

39. The one or more non-transitory computer-readable storage media of claim 28, wherein the instructions, when executed by the one or more computing devices, further cause storing first metadata indicating that the particular data block consists of compressed data, wherein the database further stores second metadata indicating that one or more other data blocks 40. The one or more non-transitory computer-readable storage media of claim 28, wherein the instructions, when executed by the one or more computing devices, further cause:
storing second data from table rows in a second table into a second compression unit;
storing at least a portion of the second compression unit in a different data block row of the particular data block in the database;
wherein the portion of the second compression unit comprises compressed data from a plurality of table rows from the second table.

41. The one or more non-transitory computer-readable storage media of claim 28, wherein the plurality of the table rows is compressed inside of the compression unit, wherein the instructions, when executed by the one or more computing devices, wherein the instructions, when executed by the one or more computing devices, further cause:
storing uncompressed data in a different data block row of the particular data block;
storing metadata in the particular data block indicating a) that the particular data block row storing the compression unit stores compressed data; and b) that the different data block row stores uncompressed data.

42. The one or more non-transitory computer-readable storage media of claim 28, wherein the instructions, when executed by the one or more computing devices, further cause:
storing metadata indicating, for the portion of the compression unit, a range of values for a particular column, wherein no table row in the portion of the compression unit comprises a value for the particular column that is outside of the range;
receiving a request for data from the particular table, said request including a predicate based upon the particular column;
in response to the request, determining whether to decompress the portion of the compression unit based upon the metadata and the predicate.

43. One or more non-transitory computer-readable storage media storing instructions that, when executed by one or more computing devices, cause performance of:
storing data for database tables in a storage device, the storage device comprising a memory organized into data blocks conforming to a data block format, the data block format including data block metadata and one or more data block rows;
storing uncompressed data for a first plurality of the database tables in a first plurality of the data blocks, each data block of the first plurality of the data blocks comprising a plurality of data block rows, each data block row of the plurality of data block rows storing data from only one table row from the first plurality of the database tables;
storing, within a second plurality of data blocks of a database, compression units comprising compressed data from tables, the compression units comprising compressed data structured in a format that does not conform to the data block format;
determining that execution of a database request requires access to data from at least one or more table rows;
retrieving one or more data blocks to which the one or more table rows have been mapped;
determining whether the one or more retrieved data blocks store any of the table rows in one or more of the compression units; and
responsive to determining that the one or more retrieved data blocks store data for a particular table row of the one or more table rows in one or more particular compression units of the compression units:
based at least partially on information in the one or more retrieved data blocks, locating at least a portion of the compression unit in a data block row of the one or more retrieved data blocks,
generating a decompressed portion of the compression unit, comprising data from a plurality of table rows, by decompressing the portion of the compression unit from the located data block row;
locating the data for the particular table row in the decompressed portion of the compression unit;
reading one or more items indicated by the database request from the data for the particular table row; and executing the database request based at least on the one or more items that were read from the data for the particular table row.

44. The one or more non-transitory computer-readable storage media of claim 43, wherein the instructions, when executed by the one or more computing devices, further cause,
responsive to determining that the one or more retrieved data blocks store data from a second table row of the one or more table rows in uncompressed form outside of any of the compression units:
locating within the one or more retrieved data blocks a data block row storing raw data for the second table row;
reading one or more items indicated by the database request from the data block row; and
executing the database request based at least on the one or more items that were read from the data for the second table row.

45. The one or more non-transitory computer-readable storage media of claim 43, wherein the portion of the compression unit comprises the entire compression unit.

46. The one or more non-transitory computer-readable storage media of claim 43, wherein the decompressed portion of the compression unit comprises an entire table.

47. The one or more non-transitory computer-readable storage media of claim 43, wherein the portion of the compression unit is at least partially located in multiple data blocks.

48. The one or more non-transitory computer-readable storage media of claim 43, wherein the instructions, when executed by the one or more computing devices, further cause:
locating, in an index, an entry associating the particular table row with at least a) an address of a particular data block of the one or more data blocks and b) a row identifier within the particular data block;
wherein the step of retrieving the one or more data blocks comprises locating the particular data block based on the address of the particular data block that was indicated by the index; and
wherein the step of locating the table row in the decompressed portion of the compression unit is based on the row identifier.

49. One or more non-transitory computer-readable storage media storing instructions that, when executed by one or more computing devices, cause performance of:
storing data for database tables in a storage device, the storage device comprising a memory organized into data blocks conforming to a data block format, the data block format including data block metadata and one or more data block rows;
compressing a particular database table within a particular compression unit, the compression unit comprising compressed data from the table structured in a format that is different than the data block format;
dividing the particular compression unit into portions;
based on the divided portions, storing the compression unit within a plurality of data blocks of a database, wherein the compression unit spans the plurality of data blocks, each data block of the plurality of data blocks comprising one or more different portions of the divided portions;
receiving a request whose execution requires access to first data from the particular database table;
determining that the database stores the first data in the particular compression unit;
determining that the first data is stored in a first set of one or more portions of the divided portions of the particular compression unit;
retrieving the first set of one or more portions from one or more data blocks of the plurality of data blocks;
decompressing the first set of one or more portions, thereby yielding one or more decompressed portions of the particular compression unit;
locating the first data in the decompressed portion of the particular compression unit;
executing the request based at least partially on one or more items from the first data.

50. The one or more non-transitory computer-readable storage media of claim 49, wherein the instructions, when executed by the one or more computing devices, further cause identifying the first set of one or more portions of the compression unit, based at least partially on metadata indicating that the first data is stored in certain portions of the compression unit.

51. The one or more non-transitory computer-readable storage media of claim 49, wherein the instructions, when executed by the one or more computing devices, further cause retrieving, responsive to the request, only the one or more data blocks that store the first set of one or more portions of the particular compression unit, and not one or more other data blocks that store the second set of one or more portions of the particular compression unit.

52. The one or more non-transitory computer-readable storage media of claim 51, wherein the instructions, when executed by the one or more computing devices, further cause identifying the first set of one or more portions of the compression unit, based at least partially on portion mapping data stored immediately preceding a particular portion of the compression unit within a first data block of said plurality of data blocks, said portion mapping data indicating, for each portion of the divided portions, a block at which the portion is located.

53. The one or more non-transitory computer-readable storage media of claim 49, wherein the instructions, when executed by the one or more computing devices, are performed without having decompressed a second set of one or more portions of the divided portions of the particular compression unit.

54. The one or more non-transitory computer-readable storage media of claim 28, wherein generating the compressed data comprises utilizing non-block-based compression to compress the data from the multiple table rows.

* * * * *

UNITED STATES PATENT AND TRADEMARK OFFICE
CERTIFICATE OF CORRECTION

PATENT NO. : 8,645,337 B2
APPLICATION NO. : 12/769205
DATED : February 4, 2014
INVENTOR(S) : Kapoor et al.

Page 1 of 1

It is certified that error appears in the above-identified patent and that said Letters Patent is hereby corrected as shown below:

In the Specification

In column 11, line 39, delete "sever" and insert -- server --, therefor.

In the Claims

In column 24, line 22, in Claim 1, delete "conforms" and insert -- conform --, therefor.

In column 25, line 24, in Claim 10, delete "into" and insert -- in --, therefor.

In column 25, line 67, in Claim 16, after "comprising" insert -- a --.

In column 29, line 51, in Claim 39, after "data blocks" insert -- consist of non-compressed data. --.

Signed and Sealed this
Fifteenth Day of July, 2014

Michelle K. Lee
*Deputy Director of the United States Patent and Trademark Office*